(12) United States Patent
Srivastava et al.

(10) Patent No.: US 11,966,724 B1
(45) Date of Patent: Apr. 23, 2024

(54) FRAMEWORK AND SYSTEM FOR BUILDING ASSISTED AUTOMATIONS FROM RECORDINGS USING PROGRAM SYNTHESIS

(71) Applicant: XXV Inc., San Francisco, CA (US)

(72) Inventors: Saurabh Srivastava, San Francisco, CA (US); Helgi K. Sigurbjarnarson, Seattle, WA (US); Henele I. Adams, Seattle, WA (US); Corianna Jacoby, Seattle, WA (US); Arthur Tilley, Berkeley, CA (US); William Stern, Pacific, MO (US); Timothy Hayes, Oakland, CA (US); Audrey Shang, Seattle, WA (US)

(73) Assignee: XXV Inc., San Francisco, CA (US)

( * ) Notice: Subject to any disclaimer, the term of this patent is extended or adjusted under 35 U.S.C. 154(b) by 273 days.

(21) Appl. No.: 17/722,116

(22) Filed: Apr. 15, 2022

Related U.S. Application Data

(60) Provisional application No. 63/176,093, filed on Apr. 16, 2021.

(51) Int. Cl.
*G06F 8/40* (2018.01)
*G06F 8/41* (2018.01)

(52) U.S. Cl.
CPC ..................................... *G06F 8/41* (2013.01)

(58) Field of Classification Search
CPC ..... G06F 8/30; G06F 8/40; G06F 8/41; G06F 8/314; G06N 20/00
See application file for complete search history.

(56) References Cited

U.S. PATENT DOCUMENTS

| | | | |
|---|---|---|---|
| 10,996,930 B1 * | 5/2021 | Wilson-Thomas | ....... G06F 8/33 |
| 2019/0171422 A1 * | 6/2019 | Udupa | ..................... G06F 8/30 |
| 2019/0332704 A1 | 10/2019 | Gulwani et al. | |
| 2020/0027015 A1 | 1/2020 | Yao et al. | |
| 2021/0334671 A1 * | 10/2021 | Minsky | ..................... G06N 5/02 |

* cited by examiner

*Primary Examiner* — Hanh Thi-Minh Bui
(74) *Attorney, Agent, or Firm* — Orrick, Herrington & Sutcliffe LLP

(57) ABSTRACT

Described herein are systems and methods for automatically building automations from desktop recordings using program synthesis. The problem of building automations for desktop applications can be lifted to a generalized concept of automations that operate on worlds whose "world state" can change asynchronously to the actions of the automation. Advantageously, in contrast with synthesis systems that take input-output demonstrations to synthesize a function that maps between them, the method presented here can synthesize from time-series traces of actions to automations that generalizes each step. The present disclosure describes ways to a) build assisted automations, b) synthesize them from recordings, c) running assisted automations using interpreters that observe the world state and adjust the actions accordingly, d) discovering them from an always-on recorder, e) suggesting them in partial progress from an always-on recorder, and lastly f) iteratively improving the assisted automation by recordings of every subsequent run.

24 Claims, 26 Drawing Sheets

FRAMEWORK AND SYSTEM FOR BUILDING ASSISTED AUTOMATIONS FROM RECORDINGS USING PROGRAM SYNTHESIS

CROSS-REFERENCE TO RELATED APPLICATIONS

This application claims the benefit of, and priority to, U.S. Provisional Application Ser. No. 63/176,093, filed Apr. 16, 2021, the disclosure of which is hereby incorporated herein by reference in its entirety and for all purposes.

FIELD

The disclosed embodiments relate generally to data processing systems and more particularly, but not exclusively, to systems and methods for building assisted automations from recordings using program synthesis.

BACKGROUND

Program synthesis can be the process of building programs from specifications of the desired behavior. These specifications can take various forms, including natural language, formal specifications, and input-output pairs. Under previous approaches to program synthesis the programs synthesized can be viewed as non-interactive, i.e., they start with some input and compute the required output. They do not interact with the environment as the program executes.

Interacting and responding to the unpredictable input that the environment is capable of producing is a challenging task for automatically synthesized programs. The methods presented herein can be viewed as solving this problem.

Exemplary advantages to the method described here for algorithmically converting a recording to an assisted automation described herein can include: 1) time-series traces taken as input-specifications for the desired program, 2) programs where each statement can be conditionally-guarded, 3) an interpreter that can evaluate the conditional guards against the current environment before statement execution, 4) synthesis generalization of concrete traces to patterns that can allow execution to run in previously unseen world states, 5) iteratively improving the synthesized program possibly using generalizing across one or more runs of the interpreter as it observes new time series data and world states.

Figure 1:
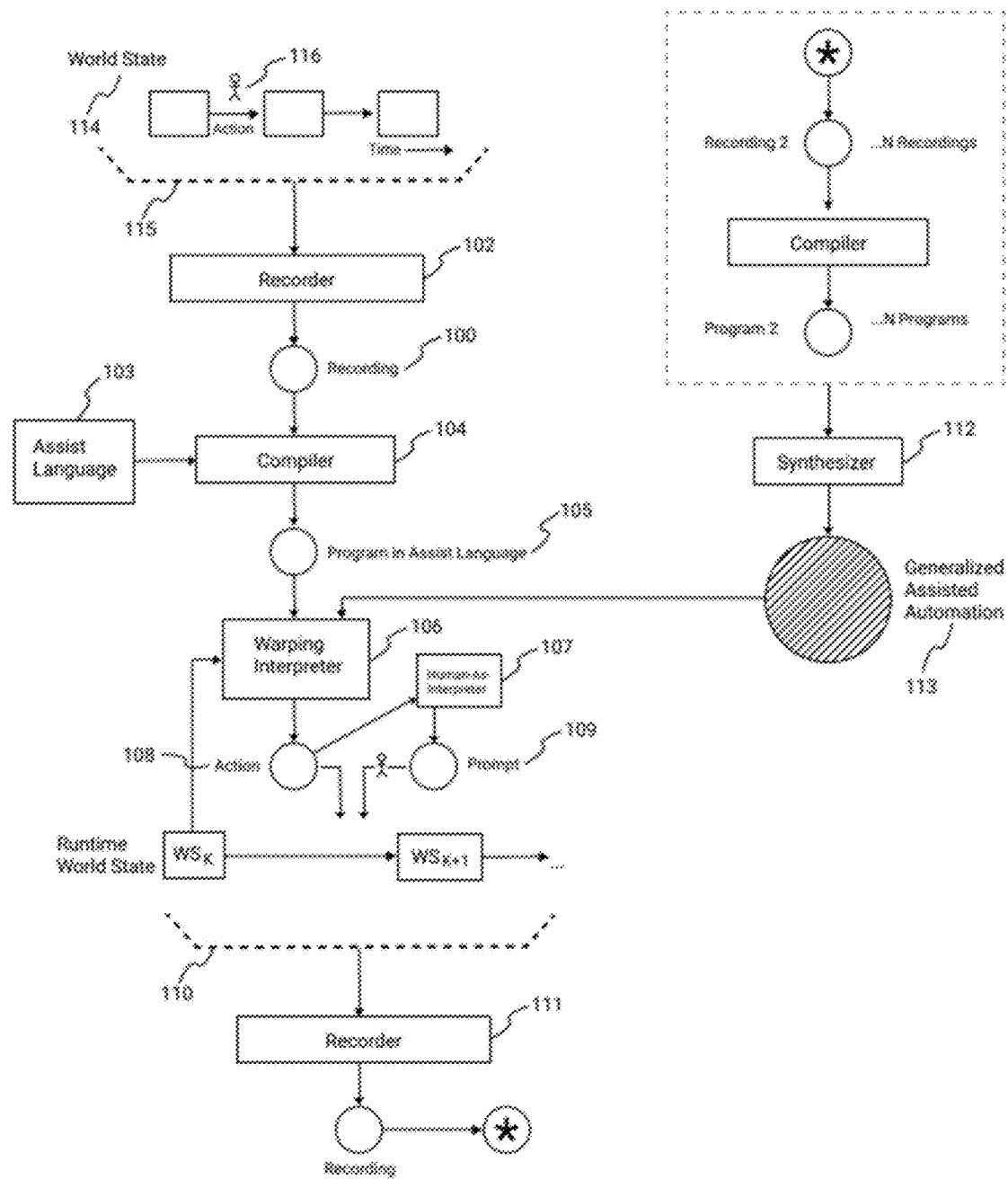
FIG. 1 is a block diagram for illustrating an exemplary embodiment of a method for building assisted automations from recordings of world traces.

It should be noted that the figures are not drawn to scale and that elements of similar structures or functions may be generally represented by reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE INVENTION

The Intent Framework

Introduction

Assisted Automations

Assisted automations can be programs that interface with a world and a human. These automations an act directly on the world or present a prompt to the human to perform actions. The world may update because of the action performed by the automation or the human. The human may or may not follow the automation's prompt precisely. The assisted automation actively observes the updates to the world's state and identifies the appropriate next step.

The number of steps at which the automation prompts the human to act on its behalf (rather than act on the world itself) is called the assist level. Full automations are thus assisted automations with assist level 0.

Consider the following as an exemplary instance of an application of assisted automations: If the "world" is a "computer desktop with a graphical user interface (or GUI)", then an assisted automation can consist of a computer program that can prompt the user with on-screen instructions to perform desktop actions, such as clicking or typing on particular elements on the screen, or at assist level 0, the assisted automation can be a full automation that can perform a task uninterrupted.

The methods presented herein describe the following exemplary features: a) assisted automations, b) methods and techniques for building assisted automations from recordings of the world and actions, c) methods and techniques for running assisted automations with arbitrary assist levels, d) methods and techniques for discovering assisted automations from an always-on recorder, and/or e) methods and techniques for suggesting assisted automations in partial progress from an always-on recorder.

Exemplary advantages of algorithmically converting a recording to an assisted automation using the methods described herein can include, but are not limited to: a) the output assisted automation code can be human-readable and concise, b) the methods can show how to construct assisted automations from a single recording using compiler techniques, and/or c) the methods can show how to iteratively improve the assisted automation by recordings from every subsequent run over a new world, in one embodiment, using program synthesis techniques.

The method described herein in one embodiment can apply to desktop automations, by presenting the following features: a) a language for desktop assisted automation, called Warpian, b) a recorder that can observe the desktop in one embodiment in a more structured way than pixels on the screen, c) a compiler that can convert desktop recordings into Warpian, called Personal Automation Compiler Compiler (PACC), d) a runtime interpreter for Warpian which can perform desktop actions and e) another that can be a human-as-an-interpreter.

Building Assisted Automations Using Recordings Rather than Programming

The method described herein in one embodiment can be an exemplary feature that allows building of readable code for an automation from recordings using program synthesis. The method described herein is in contrast with current state-of-the-art where automations are typically built by programming, which could take weeks or months. The exemplary approach described here can build automations in seconds to minutes under some circumstances.

Additionally, unlike other learning methods, the approach described here can work by generating code from a single recording, i.e., a single data point, and possibly iteratively refining the code as more recordings are observed in selected embodiments. Note that each subsequent kth recording can be an observation of the run of the automation that can be synthesized from all previous k−1 recordings. Current state-of-the-art program synthesis techniques for programming-by-demonstration (PBD) generate side-effect free functions that are not temporal automations, and do not iteratively improve. Current state-of-the-art learning methods such as deep-neural nets (DNNs) require millions, if not billions, of data points to generate a black-box model.

A recording can be a specification, in terms of a demonstration, of how the automation is expected to act in a specific scenario. A single recording typically may not cover all world scenarios that the automation might be expected to operate under, but it can provide the starting specification. Typically, a recording is understandable by a human but not a machine process. The method described herein presents a system, method, and compiler, that can lift a recording, from low level events to high level semantic operations. For instance, the method presented herein can convert low-level mouse movements, clicks, drags, keystroke ups and downs, to high level "move a file from explorer to chrome", "navigate to this URL", "click on the login button inside chrome" actions that could be executed automatically or presented to the user.

Additionally, and/or alternatively, the method described herein can be a system that identifies divergent values across recordings and turns them into a) automatically computable value functions using program synthesis or b) variable value that a human may need to input. The method described herein can use divergences across recordings to introduce control flow (e.g., branching) so that the automation can make decisions based on values during runtime. This control flow can be predicated on a) automatically computable Boolean value function possibly using program synthesis, or b) variable value that a human may need to supply.

Running Assisted Automations Using Two Exemplary Interpreters

The exemplary method described herein permits at least two ways of running assisted automations. At every time step an assisted automation can take as input the current world state and can output a series of actions to be performed on the world.

The algorithm for doing so can be encoded as an interpreter. Two embodiments are described herein: a) warping interpreter; and b) a human-as-an-interpreter, without limitation.

Both interpreters can include one or more pluggable modules. These modules can help the interpreter translate between semantically similar but syntactically different worlds. For the case of desktop actions, a recording done over Windows® desktop actions using a Windows 10 formatted Excel® UI, may be translatable to an OSX® desktop with OSX® Excel® whose UI looks substantially different but has all the semantic features of the Windows version of Excel. By choosing an OSX runtime interpreter the method described herein could translate an automation from Windows® to Mac OSX®.

The warping interpreter can take the current world state, correlate that current world state against the expected world state, and could build an action that adjusts for differences between the expected and current runtime world state. As an example, consider the automation program's next action being the high-level command "navigate to salesforce.com in the open web browser". In this case, the runtime warping interpreter could locate the web browser on the desktop (and could fail gracefully if such an application cannot be found, or does not have an open window), can identify the address bar within the web browser, send typing commands to update the address bar to reflect "salesforce.com", invoke the "go to url" operation. All of these operations can include observing and semantically understanding at runtime the desktop, the open applications, and operations supported within those applications, and to be able to programmatically execute all those operations.

A human-as-an-interpreter can take the output of the warping interpreter, which are programmatically executable actions, and could convert them into human-understandable prompts. For instance, in the description above of navigating to a salesforce.com, a prompt of the form "send keystroke s-UP and s-DOWN into ui-element chrome widget 23" can be frustrating and not useful for a human. Instead, in one embodiment it can present an on-screen chevron that points to the address bar and prompt the user to "Type salesforce.com into the location highlighted".

In addition to the interpreter, the runtime also can include an observer that a) can record the new world state and/or b) can identify if the actions output by the interpreter are successfully performed on the world. The recording of the actions advantageously can allow the method to iteratively refine an assisted automation, as described in the section herein on building automations. The success check could allow the observer to send a signal to the interpreter to increment the program counter.

There can be two options for performing the action: a) in one embodiment warp, i.e., automatically execute, the action; or b) in another embodiment have the user perform the action manually as prompted. In the former, the interpreter can perform the action on behalf of the user. In the latter, the observer described here could note when the action was performed and could send an auto-advance signal to the interpreter which can update the program counter.

Note that the warping interpreter, if run in assist level 0 mode, can result in an intelligent fully automated execution of the program, while adjusting and considering the runtime evolution of the world state.

Assisted Automations, and the Intent Framework

The sections below describe exemplary features of taking a recording to an assisted automation, which make up the intent framework.

An exemplary embodiment of the intent framework is shown in FIG. 1. FIG. 1 illustrates a World 115 that can be an environment that changes over time by itself, and in response to external stimuli, both from unobservable external actors, and from the actions of the automation. FIG. 1 also illustrates a World State 114 that can be a structured snapshot of the world at a particular time step. One or more control mechanisms can permit sending inputs to the world. FIG. 1 also illustrates Action 101 that can be specific inputs sent to the world using one of the controls. FIG. 1 also illustrates a Recording 100 and Recorder 102 that are timed sequence of world states interleaved with actions. An Intent is a semantic operation that represents a (set of low level) actions by abstracting away non-generalizable details from them. FIG. 1 also illustrates an Assist Language 103 that can be a programming language with standard control flow and base operations as any general-purpose language, augmented with intent and actions constructs. FIG. 1 also illustrates an Assisted Automation 113 that can be a program written in the assist language, optionally containing input variables. FIG. 1 also illustrates a Semantic compiler 104 that can be a compiler that converts actions to intent. FIG. 1 also illustrates a Semantic synthesizer 112 that can be a program synthesizer method that takes multiple recordings of intent and creates variables and control flow and synthesizes readable code for the functions that map the program's variables and conditional predicates to values based on others in the program. FIG. 1 also illustrates a Human-as-an-interpreter 107 that can be a runtime that uses a human to do the next action on the world and moves the program counter forward when action is performed. FIG. 1 also illustrates a Warping interpreter 106 that can be a runtime that directly executes the next action on the world.

Together, and in part, these components illustrate the capability to take a recording 100 to an intent program 113 in an assist language 103, using a semantic compiler 104.

Together, and in part, these components illustrate the capability to execute the assist-language program 105 using a customer warping interpreter 106 to gather additional observations of its own operation.

Together, and in part, these components illustrate the capability to synthesize 112 a robust assisted automation 113 using a semantic synthesizer 112.

Although shown and described with reference to FIG. 1 as comprising an exemplary combination of features for purposes of illustration only, the intent framework can comprise any combination of suitable features.

Additionally, and/or alternatively, the following components can augment the core of the intent framework that takes recordings to assisted automations: discover automations, predict automations, composing automations.

Figure 2A:
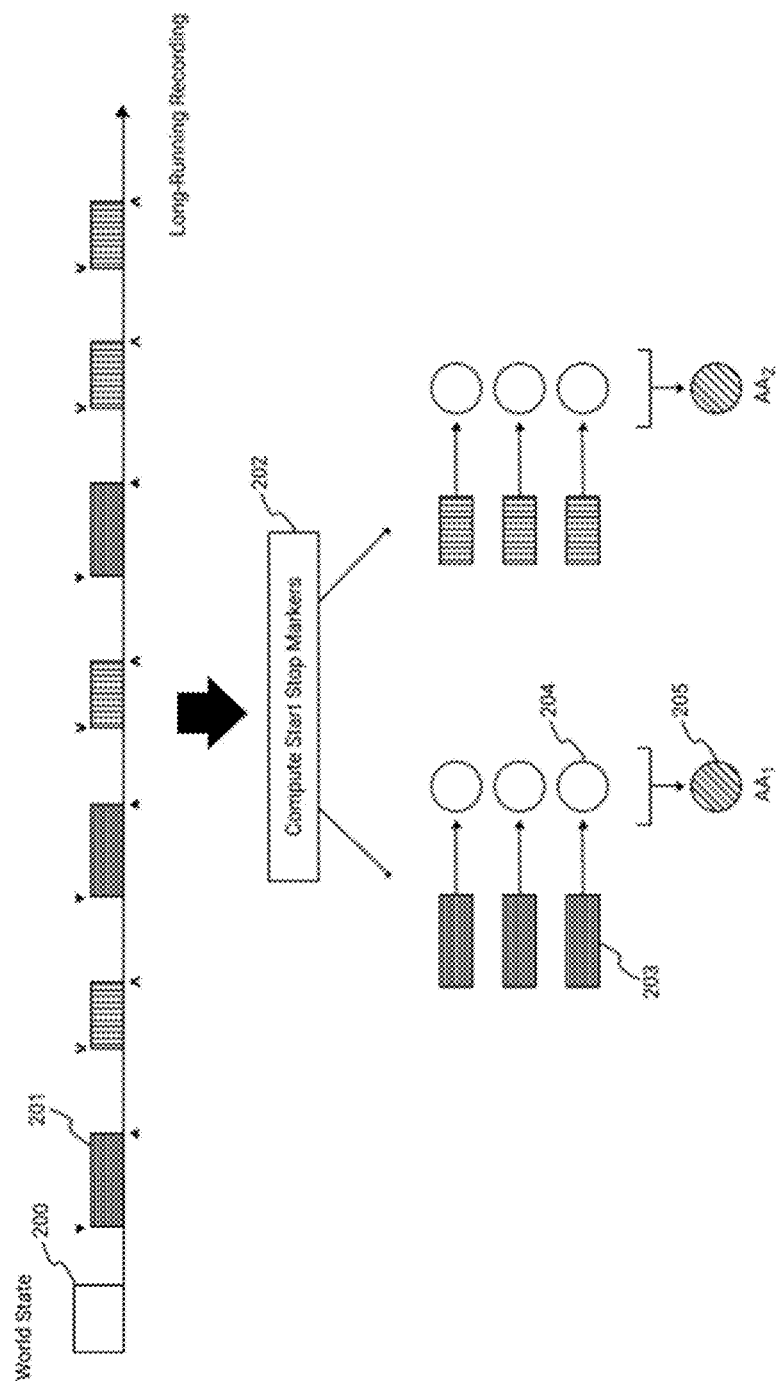
FIG. 2a is a block diagram for illustrating an exemplary embodiment of a method for discovering assisted automations from long running recording of world states.

In a first exemplary embodiment, the ability to discover assisted automations from an unannotated always-on recorder as shown in FIG. 2a. It can consist of an extended length recording 200 that has fragments 201 of interest that could be used as example recordings for an automation. There can be a module 202 that could compute the start and end markers, and each recording contained within 203 could be converted to a program 204. These programs could be combined into authoritative assist program 205.

Figure 2B:
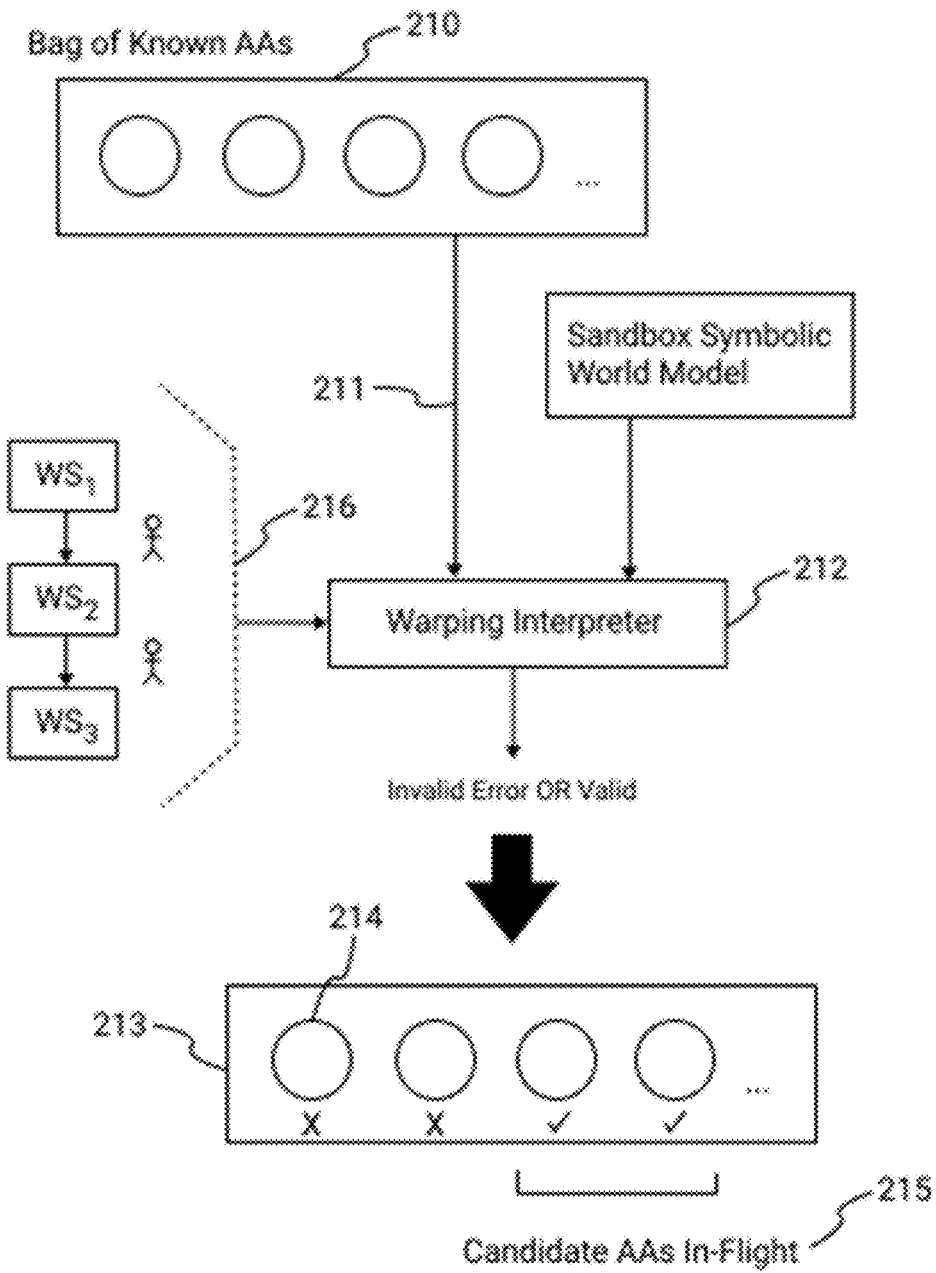
FIG. 2b is a block diagram for illustrating an exemplary embodiment of a method for predicting in-progress automations, according to an embodiment.

In a second exemplary embodiment, the ability to use an always-on recorder to predict that the human actions are a prefix to a known assisted automation as shown in FIG. 2b. It can take as input a set of assisted automations 210 and a sandbox symbolic model of the environment 211 and use a warping interpreter 212 to execute the current observed world state 216 in the sandbox environment. If the interpreter output is valid in the sandbox environment for a given automation it can be marked as a viable candidate 215 while the rest can be marked as invalid 214. Over a time-period the set of viable candidates will narrow to a small number that can be presented to the user.

Figure 2C:
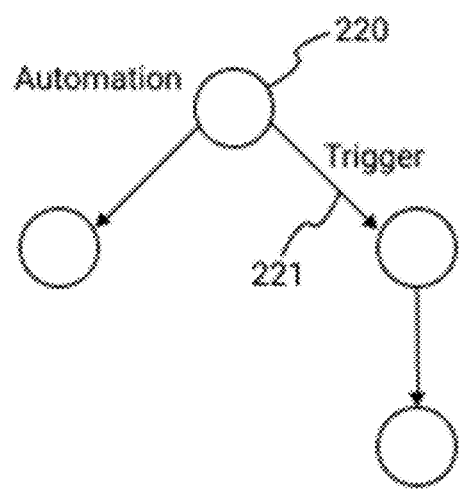
FIG. 2c is a block diagram for illustrating an exemplary embodiment of a method for composing assisted automations.

In a third exemplary embodiment, methods for composing assisted automations into automations that span multiple execution environments and human operators as shown in FIG. 2c. Assisted automations 220 can be combined in a graph structure where the end of one assisted automation can trigger 221 a set of downstream automations, which can in turn do the same. This dependency graph of automations can be used to compose arbitrary automations.

Recording

In one exemplary embodiment a recorder can intercept the action, identify which world object it will act on, record the action and the object along with any related other objects in the prior world state, send the action to the world, and optionally record the resulting states of related objects after the action.

Figure 3:
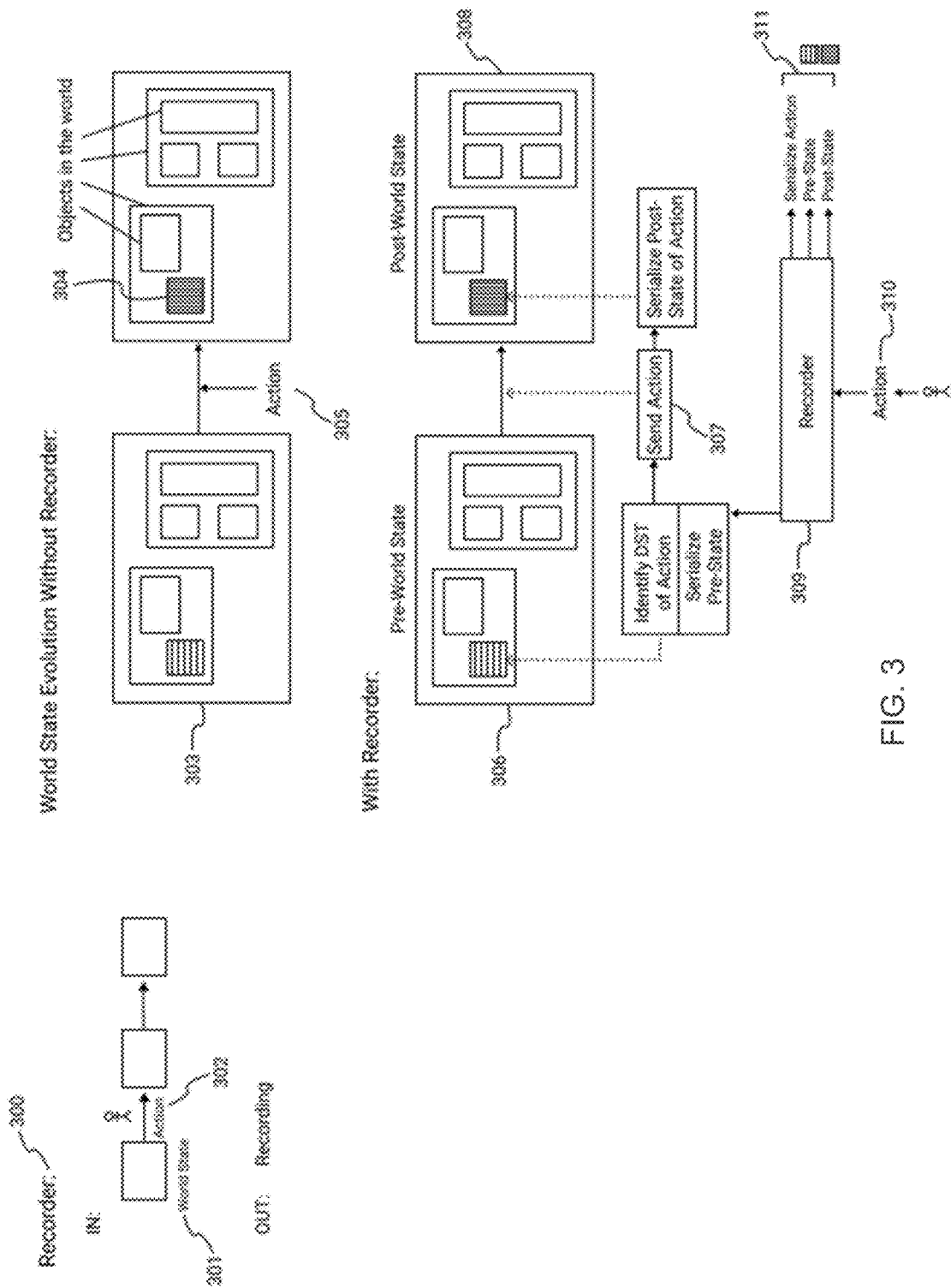
FIG. 3 is a block diagram for illustrating an exemplary embodiment of a method of capturing the change of world states along with causal interleaved actions that lead to those changes in a recording.

An exemplary embodiment of a recorder 300 in the intent framework is shown in FIG. 3 that can capture the actions 301 (i.e., inputs to the controls) and snapshots 301 of the world state. The world can evolve independently from external stimuli that might be unobservable to the system. Therefore, in the ideal case the world state can be captured before 303 and after the action 305 where certain objects 304 in the world have changed. Note that, in selected embodiments, for downstream compilation it may be prudent if the action 310 was intercepted by the recorder 309, the pre-state 306 captured synchronously, action emitted to the world 307, and post-state 308 captured subsequently. Although shown and described with reference to FIG. 2 as comprising an exemplary combination of features for purposes of illustration only, the recorder can comprise any combination of suitable features.

The recorder can choose to capture an optimized world state by only storing the state of the objects being acted on 311. Additionally, or alternatively, the recorder can augment the recording with state information gathered from querying the object itself. This augmentation can permit the compiler to lift the action into a semantic intent specialized to the type of object being acted on.

Compiling an Assisted Automation from a Recording

Domain-Specific Language (DSL) for Semantic Representation of Intent

If the aim is to design a language to represent intent formally, in one embodiment it can satisfy the requirements: A) The DSL, in one embodiment, should be Turing complete to represent arbitrary intended processes. This can be satisfied by embedding the DSL in a general-purpose language. This permits the existence of decision-making (if-then-else), repeated tasks (loops), amongst other logically useful constructs. In certain embodiments, this embedding is in 'python', but not restricted to it. B) The DSL's statements, in one embodiment, should be sufficiently high-level, to be human-readable. After all, they aim to specify the intent of human actions, which tend to be easily described. C) The DSL's programs, in one embodiment, should be formal enough to be from a machine process. Specifically, English prose might not be best fit as the DSL, as that is hard to output formally with sufficient precision from a machine process. The intent framework described here can include a compiler that converts low-level operations to high-level intent, and its output can be in an assist language. D) Lastly, in one embodiment, programs in the DSL may be easy to symbolically execute. This is useful for multiple intent framework modules: evaluating equivalence of program fragments (to identify if two recordings contain the same intent), synthesis of a generalized program, discovery of generalized programs within unannotated recordings, or predicting partial executions. If the following hold for the chosen DSL, then symbolic execution is simpler to ensure: D1) Use of functional statements and immutable state, which leads to simpler maintenance of output states, without needing to merge memories, and simplifies the ability to symbolically execute. D2) Use of bounded strings, enables easier symbolic execution. Unbounded symbolic strings lead to undecidable decision procedures, consequently restricting to bounded strings can enable ease of symbolic execution. D3) Use of integers and rational numbers, rather than floating point, enables simpler symbolic execution. Since symbolic floating-point values are hard to reason about, restricting their use can enable ease of symbolic execution.

The assist languages can satisfy the above constraints, and as a result be symbolically executable, which in turn enables equivalence evaluation, synthesis, discovery, and prediction. All this is enabled while simultaneously being human-readable, and general purpose to express any formally definable intent.

Compiler: From Action to Intent

Normally, a compiler would take a human-written program and convert that program into machine-readable executable code. The compiler in the intent framework has the opposite task: The compiler can take as input low level actions from the world, which can be seen as the execution of an unobservable model in the human head. It can then output a program in a high level assist language.

A potential approach to translation might be to pattern match against a collection of (low level actions that maps to high level construct)'. This approach may not be the most prudent for the objectives described here. A pattern matching approach may be brittle (failing to match because of the pattern being too specific), non-scalable requiring millions of patterns in real-world scenarios, non-generalizable (failing to match against more expressive scenarios such as those requiring counting or needing expressivity that cannot be encoded in regular patterns), or an unreadable bag-of-heuristics. An example would be a DNN learnt for such a task, which might have these undesirable characteristics.

Instead, the method described herein takes inspiration from compiler design, and can define "passes" that can sequentially do whole program analysis+transformation to lift the program through higher and higher levels of abstraction. These could be analysis or transformation passes, but not limited to them.

Analysis passes could analyze local windows of statements or do full program analysis to identify information. An illustrative example of this is a pass that might extract information for a potentially toggle-able state of an object, let's say ON or OFF. Imagine if the state toggles a couple of times in the recording, and the object behaves to stimuli differently in the ON state compared to the OFF state. Pressing buttons on car's weather controls when the air conditioning is ON has effects, while it is redundant in the OFF state. A pass that does a whole program analysis can extend the toggle state information to every time step of the recording.

Transformation passes could translate fragments of the program into a new statement in a higher level of abstraction. The transformation passes typically use information generated by the analysis passes.

The transformation and analysis passes can be defined to have dependencies amongst each other, and that dependency graph can be topologically sorted to identify the sequence of application of each pass.

Executing an Assisted Automation

Warping Interpreter

Figure 4A:
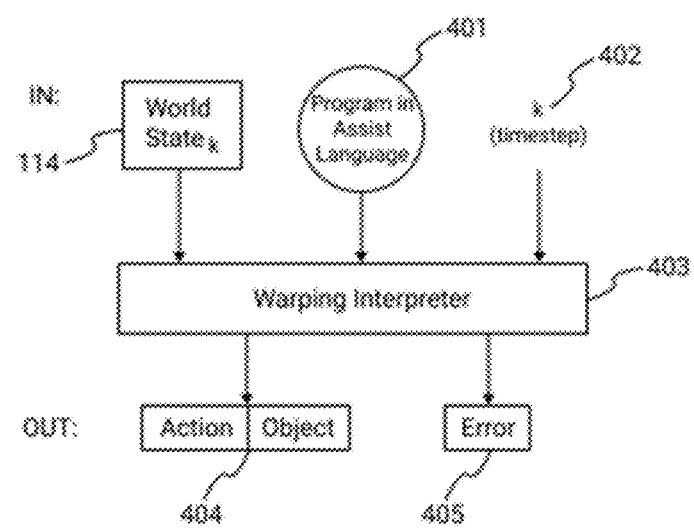
FIG. 4a is a block diagram for illustrating an exemplary embodiment of a runtime warping interpreter that takes as input a program in the assist language, inspects the current world state, and outputs an appropriately adjusted action, according to one embodiment.

FIG. 4a illustrates a Warping Interpreter 403 that may take as input a World State 114, a program in an Assist Language 401, and a timestep 402, and output an action on an object 404 or an Error 405.

In an exemplary embodiment, the intent framework can have a primary runtime interpreter 403 that takes as input a program in the assist language 401 and interacts with the world state 114 performing actions on it relevant to the given timestep 402. The interpreter can output actions on specific objects 404 in the world or an error 405 if the world is in an unexpected state.

A warping interpreter is different from a normal interpreter of a programming language, in that the world state may get modified asynchronously from the interpreter's actions. Imagine if the memory state of a program could get modified from external agents. Asynchronous state modification could pose a significant problem to normal programming language interpreters.

Figure 4B:
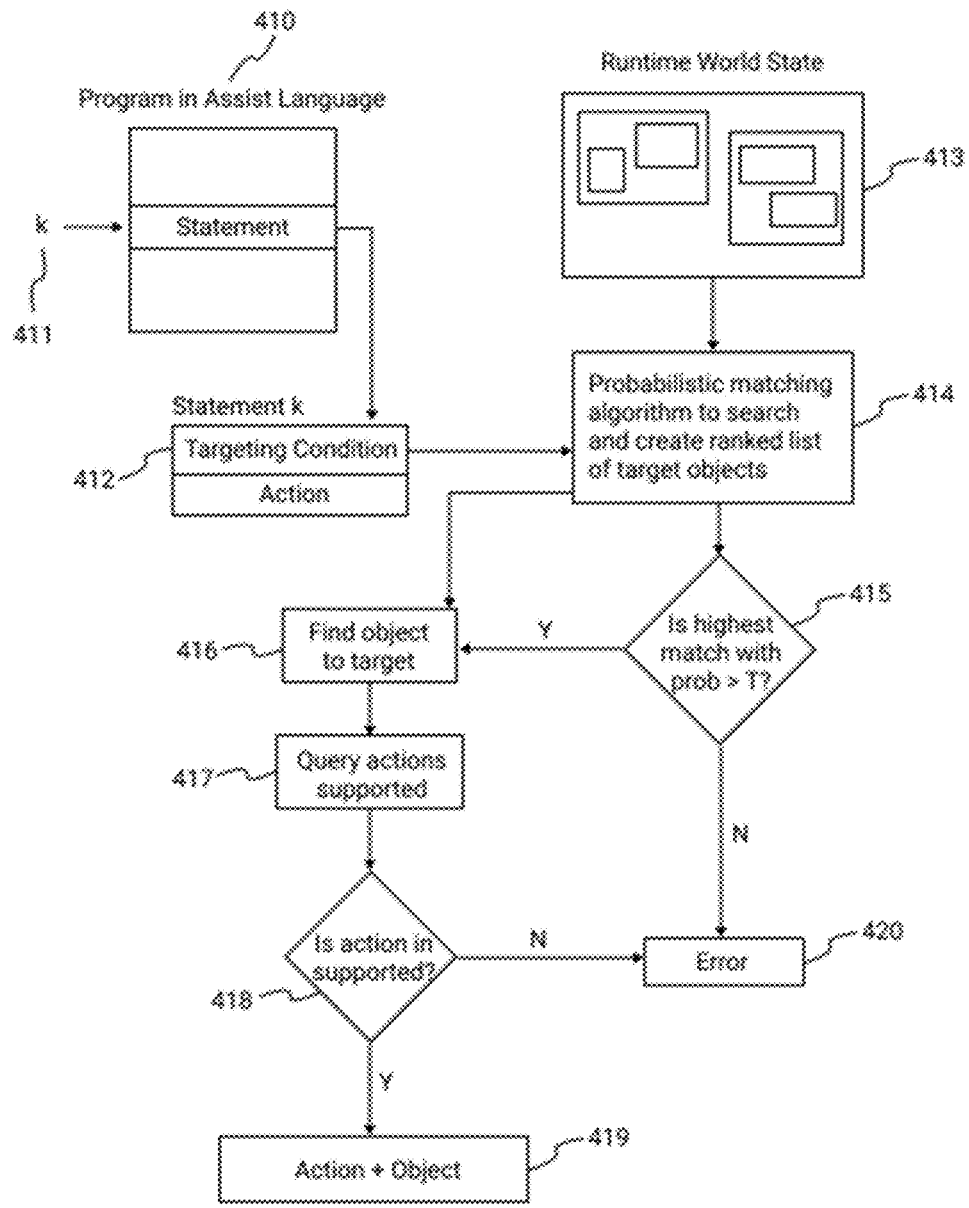
FIG. 4b is a flowchart for illustrating an exemplary embodiment of a method of operation for the warping interpreter.

The way the method described herein solves this is to have the interpreter read the world state before every action as illustrated in FIG. 4b. It may take as input a program 410 in the Assist Language, and a runtime world state 413, and identify the object in the world state on which to perform the action 419 or compute an Error State 420.

Since the world state might be intractably large, each statement 411 in the assist language program 410 can have a targeting condition 412 that identifies 414 the world state object 413 that the statement's action would be sent to. The runtime can use the targeting condition to query for the object in the world state before each operation, using a probabilistic match above a certain threshold 415 to find the target object 416. This runtime can help ensure that unrelated objects in the world state during recording do not cause overly precise runtime expectations. Once the runtime finds the object 416, it can then query 417 for the actions supported 418 by that object instance. Assuming the object supports the statement's action, the runtime can invoke that operation 419 on that object.

Although shown and described with reference to FIG. 4a and FIG. 4b as comprising an exemplary combination of features for purposes of illustration only, the warping interpreter can comprise any combination of suitable features.

Human-as-an-Interpreter

Figure 5:
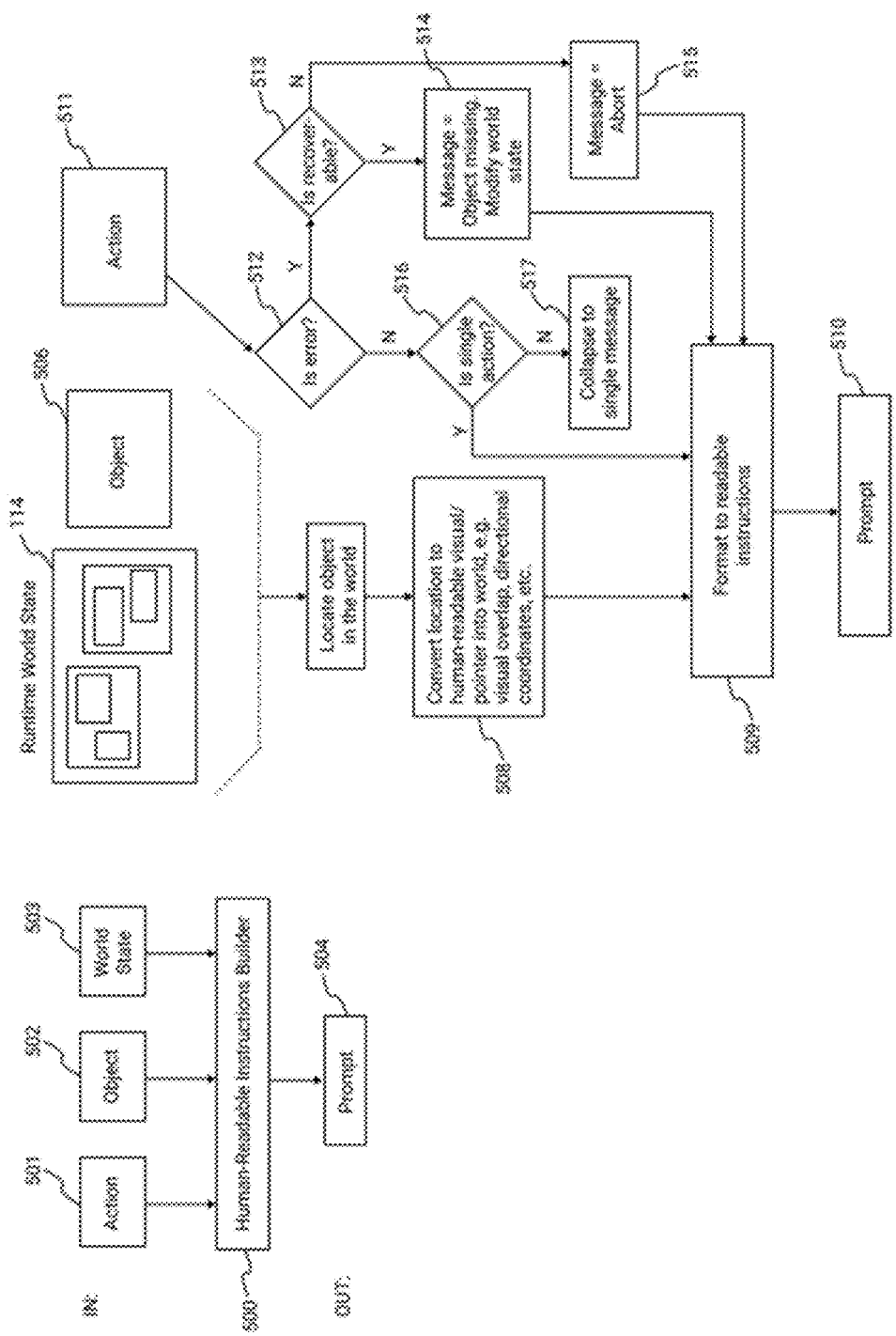
FIG. 5 is a block diagram for illustrating an exemplary embodiment of a human-as-an-interpreter, and the corresponding flowchart illustrating a method of operation for the same.

The intent framework contains an exemplary advantage of a feature that is called a human-as-an-interpreter as illustrated in FIG. 5. Real world environments are unlike bounded-state, well-specified, man-made environments. An example of a well-specific man-made environment is a central processing unit (or CPU) processor. A CPU's operating and response characteristics are precisely defined, which enables writing of deterministic programs over it. On the other hand, if the expectation is of perfect execution of a process or program over a real-world environment, two extreme scenarios can exist: the process can be run completely manually with a human making decisions, or the process can be a program that is very limited in scope and handles everything under that scope, and on exceptions reports to a human when the scope is violated. Neither may be acceptable extremes. Additionally, the objective here is especially challenging since the objective is to build automations from single recordings.

The method described herein presents an exemplary programming language runtime as shown in FIG. 5 where it can examine the world state 114 to locate the object 507 of interest 506, but instead of executing the statement at the current program counter on the world, it builds 508 a prompt 510 for the human, in a readable and visually understandable way 509, to do the action 511 on its behalf. In cases where the world state has deviated from the program expectation, the human can inject local decision making and perform the task not precisely as indicated but approximately, so the intended world state transformation can be achieved. This can be done by checking the action is an error state 512 and if it is recoverable 513. If it is not then to present the error case to user 515, or else compute recovery instructions 514 and compute 509 and send as prompt 510 to user. If action is not an error, then the method can evaluate if it is a single action 516, and if not collapse to single prompt 517, and in either case send to prompt formatter 509 to generate prompt 510. This ensures that the intent framework can generate automations from single recordings, but at the same time learn about corner cases as the human-as-an-interpreter runs. Although shown and described with reference to FIG. 5 as comprising an exemplary combination of features for purposes of illustration only, the human-as-an-interpreter can comprise any combination of suitable features.

Self-Learning: Synthesizing an Iteratively Improving Automation by Recording its Own Executions on New Worlds Self-Learning: Auto-Advance, and Iterative Improvement A single recording rarely captures the full scenarios the assisted automation may need to handle. Multiple recordings may be needed under varying conditions of the world, and additionally methods may be needed to generalize multiple recordings into a single assisted automation. The next section will describe systems and methods for generalizing across multiple recordings. This section described certain embodiments of collecting them.

In certain embodiments, multiple recordings are collected by having humans do the task, and batch process them. Alternatively, an exemplary system would be one that improves by doing.

Figure 6:
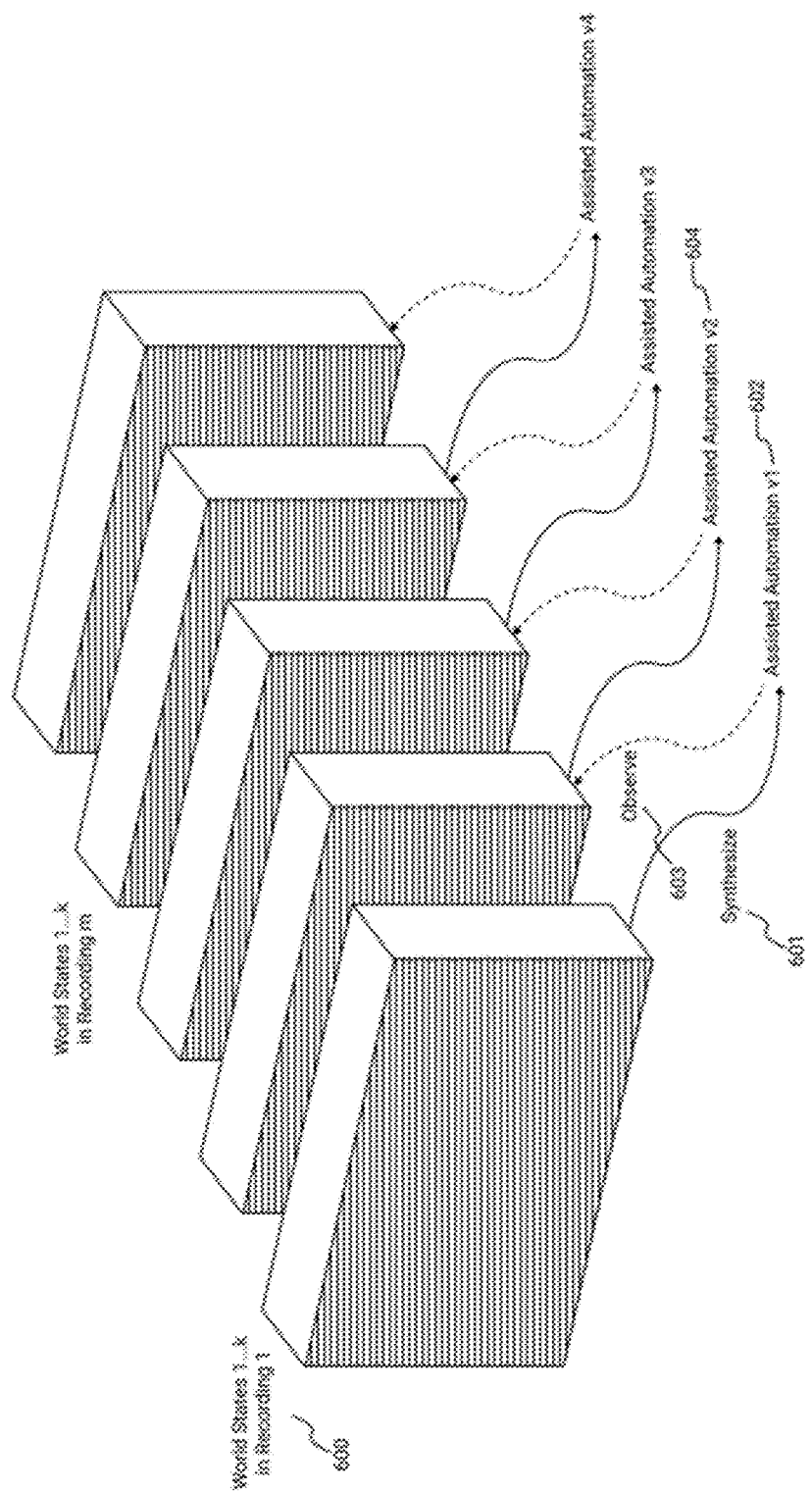
FIG. 6 is a block diagram for illustrating an exemplary embodiment of a process by which an assisted automation may iteratively improve itself.

The intent framework can make use of a system that observes its own runs and learns from them as illustrated in one embodiment in FIG. 6. The world state of a single recording 600 is used to synthesize 601 an assisted automation 602, whose execution in turn is observed 603 and can be captured in a new recording from which an improved automation 604 can be computed that combines the behavior of both recordings. Although shown and described with reference to FIG. 6 as comprising an exemplary combination of features for purposes of illustration only, the method to learn from observing its own operation can comprise any combination of suitable features.

The method described herein accomplishes iterative improvement by using the components from the previous sections. It can use human-as-an-interpreter to perform the task, which can accomplish two objectives: a) As an exemplary embodiment, it reduces variance across the recordings, since the human will be prompted to do an action, and if the human chooses to perform the action as stated, then the new run could affirm the action, and if the human chooses to deviate from the prompt, then it is an explicit divergence that may be useful in subsequent generalizations. b) As an exemplary embodiment, if the world state deviates from previous encountered states, then while the prompt might be accurate in what the assisted automation believes, the human's judgment could permit the method to identify variances in the world state that are relevant for alternative actions from those that are benign and may be ignored. In addition, in one exemplary embodiment running the recorder alongside the execution of the program can capture a new recording from at least one more run of the assisted automation.

An exemplary consequence of this is that assisted automations can self-learn. Assisted automations can observe their own execution and improve over time.

There are two exemplary features that may be included to reduce human effort. The first can be "auto-advance". Since the recorder is running alongside the interpreter, the recorder can observe when the human performs the prompted action. The recorder can communicate with the interpreter and move the program counter forward automatically. The second can be "warping". As a consequence of the warping interpreter's design (which underlies the human-as-an-interpreter), the prompting process can identify the object in the world state and can ensure that it supports the requested action. The system can present an option on a trigger that could invoke that action automatically on the object. Such triggers could be a hotkey press (e.g., F11), a click, a touch, or a gesture, or any mechanism that can capture a single bit of information from humans.

Figure 7:
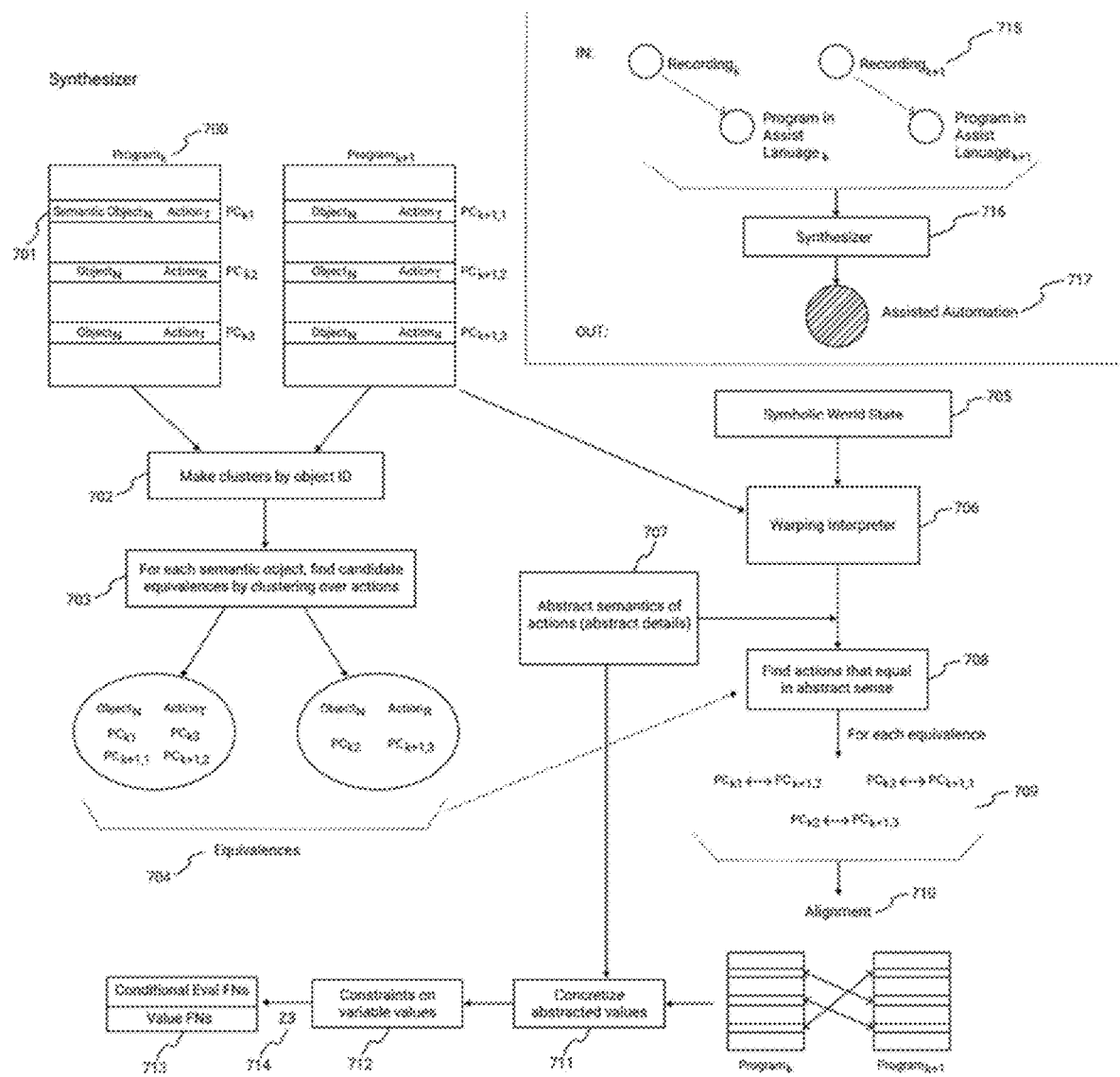
FIG. 7 is a block diagram for illustrating an exemplary embodiment of a method for the synthesis of assisted automation from potentially multiple recordings.

Assimilating New Recordings into a Generalized Assisted Automation Using Program Synthesis FIG. 7 illustrates an exemplary embodiment of a method that can use a program synthesizer to combine multiple recordings to build an assisted automation that is expressive enough to encapsulate the generalized actions needed in each world state encountered in those recordings. The synthesizer could take as input a set of recordings 715 and use a synthesis procedure 716 to output an assisted automation 717.

Each recording 700 can be converted into an assisted automation from the compilation process which is a program with statements that are actions on semantic objects 701, and so assimilating multiple recordings reduces to assimilating two assisted automations together. To do that a few helper modules can be used: a) An alignment module (Align) 702 703 and 704, b) An abstract semantics of actions 707 and a corresponding abstract interpreter (AbIn) over those abstract semantics, c) A symbolic executor (SyEx) 706 for functions in the assist language, d) a theorem prover (TP) 714 to solve the constraints generated by the symbolic executor.

The system for assimilating can then be described as the following: A) In one embodiment the Align may be used to reorder one program's statements such that the two programs are maximally aligned 710. A1) Align uses AbIn 703 to execute the program over the abstract semantics to find statement equivalence 704 without getting bogged down by details from each of the two programs. A2) The details that are abstracted away 708 can be kept aside for use later, as a constraint set 'C(1)' 712, for location '1'. B) In one embodiment, from the aligned programs the module can create a template 711. This template can include conditional branching if the fragments contain activity that may not be present in the other. For all other fragments, wherever details were abstracted, the method can put in placeholder functions 'Fn(1)' for location '1'. C) In one embodiment, it is possible to enumerate all candidate functions for 'Fn(1)' from a grammar for expressions. In practice the method can terminate this enumeration to a finite set of candidates. The method can additionally represent this function space symbolically as well. D) In one embodiment, the method can then use SyEx to execute each 'Fn(1)' and add constraints on its input-output from 'C(1)'. E) In one embodiment, the method can then use TP (e.g., the theorem prover Z3) to check for the satisfiability of the constraints generated by the previous step. If they are, then the method has a candidate solution for the value function. F) In one embodiment, the templated program can then be instantiated with the functions 713 solved by TP 714, thus completing the assimilation process.

Exemplary features of the synthesis method described here may include steps for a) alignment, b) creating control flow scaffold and variable introduction, c) synthesizing functions that map variables to values, d) synthesizing functions that map conditional predicates to Boolean values, e) creating free-variables (for human input during runtime) when synthesis of value functions is unsatisfiable, and f) combining the synthesized functions, conditional predicates, human-input variables into the control flow scaffold to create a final generalized assisted automation.

Although shown and described with reference to FIG. 7 as comprising an exemplary combination of features for purposes of illustration only, the method for assimilating subsequent recordings to improve an automation can comprise any combination of suitable features.

Note that AbIn, SyEx, and TP can be easily constructed by someone well versed in the arts. The exemplary feature of the method present here may be the Align module, but not limited to it.

The Align module can be described as the following: A) In one embodiment, cluster statements based on objects they act on. B) In one embodiment, cluster the sets from the previous steps based on actions. C) In one embodiment, run the warping interpreter over a symbolic start state to identify which actions are equal under the chosen abstract semantics. D) In one embodiment, use the equality of actions under this abstract semantics to create an equivalence mapping between the original statements. E) In one embodiment, reorder the statements of one program to minimize the number of out-of-order statements between the two programs.

Discovering

Figure 8:
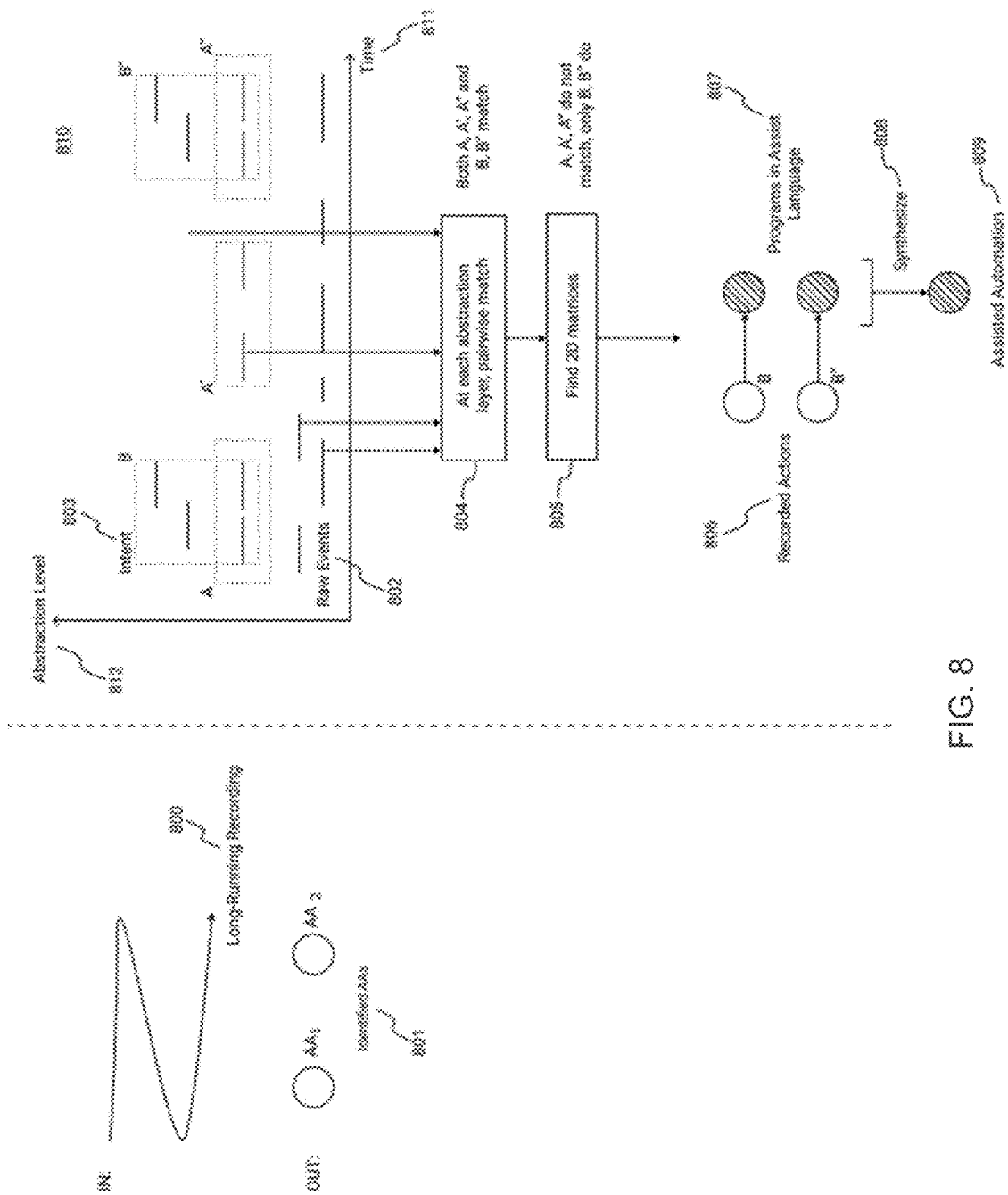
FIG. 8 is a block diagram for illustrating an exemplary embodiment of a method for discovering automation fragments without annotations from an unannotated recording of world states and actions.

An exemplary embodiment of the intent framework is in finding automation opportunities 801 without explicit user ask. In such an operation mode, the framework can observe a human's work in the background and can create a long running recording 800 that does not have any start or end annotations as shown in FIG. 8.

Such recordings may be over hours, or even weeks or months. It is also conceivable that the recordings could be across multiple users, e.g., an entire department at a business. The systems and methods described here can identify fragments of work that are generalizable into assisted automations, and to automatically create those automations and suggest them to the user.

One exemplary method consists of conceptually embedding the recording in 2D space 810, with time being on the horizontal axis 811, and the vertical axis being layers of abstraction 812, the higher the more abstract. In particular, the lowest level of abstraction is the raw input 802 from the controls and the raw world state. The intent framework includes a compiler that with each subsequent pass elevates the level of abstraction, while staying within the representation of the assist language. The output from each pass can be viewed as moving vertically in this 2D space. Note that, at each stage up there will be fewer program statements, as the resulting program gets closer and closer to concise semantic intent 803.

The process of discovering start and stop tags may consist of identifying equivalence "boxes" 804 in this 2D space 805. There can be thresholds on the minimum number of actions needed on the candidates to only suggest non-trivial automations 809. Once the start and stop candidates have been identified, the synthesis method 808 from before can be run to generate assisted automations 809 from recordings 806 that get compiled to assist programs 807.

There can be thresholds on the complexity of the automation generated, which might require backtracking to remove candidates from the set being assimilated together. There would need to be at least two fragments that are needed to identify start/stop boundaries 804. But the discovery process does not preclude a plethora of candidates for a single assimilation. In that case, there is a possibility to compute an overly complex automation (e.g., in terms of the number of conditionals in it). Intermediate data during the scaffold creation process in synthesis can identify which recording fragments introduce complexity, and it could backtrack, remove those candidates, and rerun synthesis.

Although shown and described with reference to FIG. 8 as comprising an exemplary combination of features for purposes of illustration only, the method for discover automation opportunities can comprise any combination of suitable features.

Predicting

Figure 9:
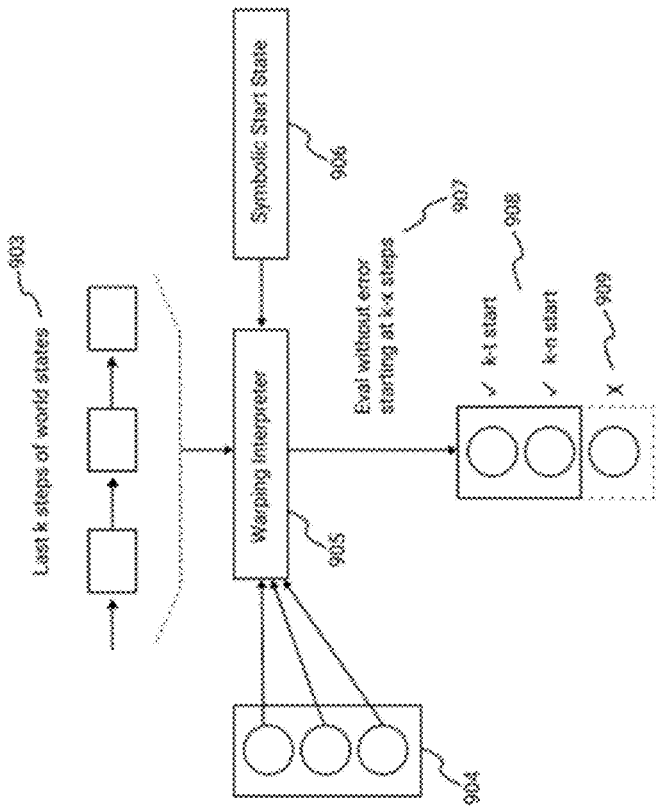
FIG. 9 is a block diagram for illustrating an exemplary embodiment of a method for predicting in-progress automations by symbolically executing every known assisted automation in repository against last-k steps over a sandbox world, and any automations that are consistent with the current prefix of the observed world actions can be suggested as in-progress automations.
Figure 9:
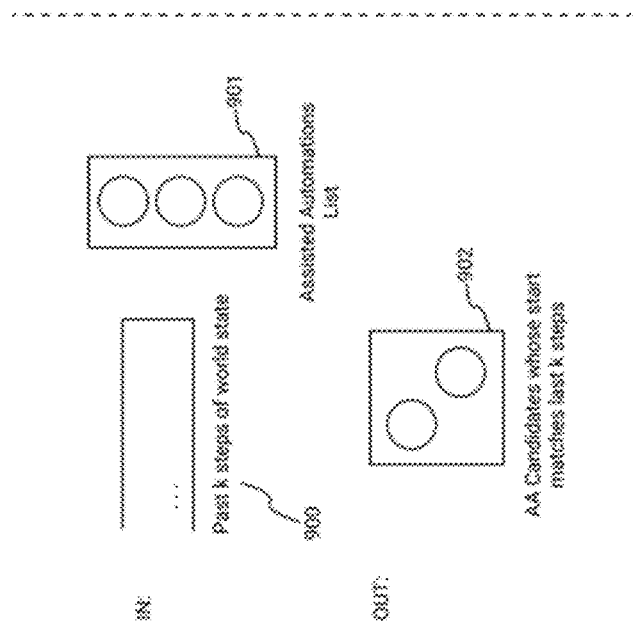

An exemplary embodiment of the intent framework is in suggesting to the user that they might be in the middle of a known assisted automation, and that the intent framework can take over operation from them (through the warping interpreter) or guide them into performing that task (through the human-as-an-interpreter) as shown in FIG. 9.

An objective of this framework may be to monitor the user's actions transparently in the background, and whenever a prefix of an assisted automation matches the last-k actions of a user 900, to suggest starting the candidate assisted automation 902 (midway in its execution), from a universe of candidate automations 901

The method for predicting these "in-flight" automations can be the following. Take as input a set of assisted automation candidates 904, and the last-k actions of the user 903; where k is some non-trivial set of actions. It is best that k is not too small or too many candidates will match. In one embodiment, k may be more than 5 actions. The method can run the warping interpreter 905 from a symbolic start state 906 using a sandbox world evaluation 907 over the last-k actions, and if the automation does not error out, it is a candidate 908 for suggestion to the user, or else it is excluded 909. The method described here can run this inference method in parallel over all input candidate automations and suggest to the user the viable ones that match.

Although shown and described with reference to FIG. 9 as comprising an exemplary combination of features for purposes of illustration only, the ability to predict automations can comprise any combination of suitable features.

Composing

Figure 10:
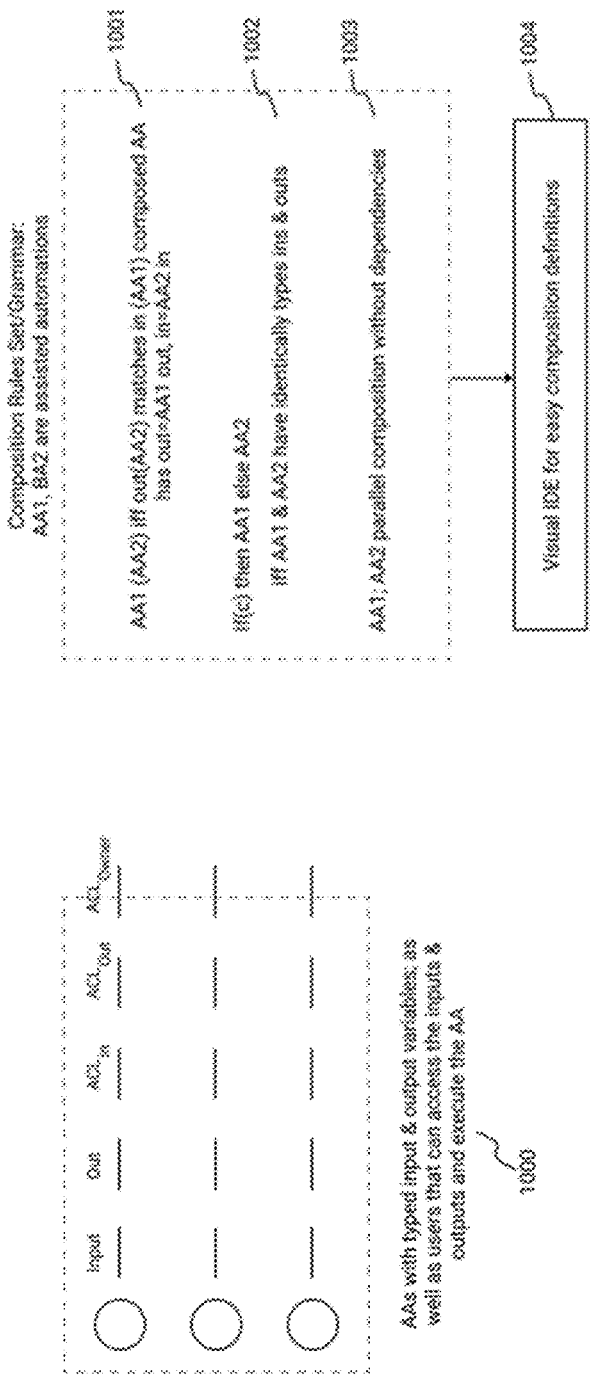
FIG. 10 is a block diagram for illustrating an exemplary embodiment of a method for composition to chain assisted automations into operations across multiple desktops and across multiple human users.

Assisted automations may be composed together to build sophisticated processes 1000 that span users, desktops or cloud machines, days, world states as shown in FIG. 10. Below some exemplary embodiments are described.

An exemplary embodiment of composition is hand-off across multiple users. In this scenario an assisted automation being run by one user can initiate a message to another user's instantiation of the intent framework, asking them to run a downstream assisted automation at the end of the prior one.

An exemplary embodiment of composition is triggering on world events and/or scheduling to run at designated times. In this scenario an assisted automation can be set up to watch events on the world and to start the execution when the trigger condition is met. These could be a) world activity, e.g., object appears on the world state, or an internal world state value is updated, amongst others, b) time triggers, e.g., every morning, or at 4:32 am Paris time every other day in March in leap years, amongst others.

An exemplary embodiment of composition can be batched runs. In this mechanism, a dataset is provided as input and the assisted automation can take the data within the dataset as enumerated input and run the automation either sequentially or in parallel.

An exemplary embodiment of composition can be hand-off from one assisted automation to another. Such a composition can be: A) In one embodiment, Sequential 'A(B)', i.e., the first automation completes and triggers a subsequent one passing it the relevant inputs needed 1001, B) In one embodiment, Parallel 'A//B', i.e., an automation triggers multiple others to run subsequently and in parallel 1003, C) In one embodiment, Conditional 'if (cond) then A else B', i.e., if a certain condition is met, trigger one automation else trigger another, both with appropriate inputs. 1002, or D) In one embodiment, Iterative 'loop (cond) do A', i.e., trigger an automation with appropriate input repeatedly if a condition stays true, which can be written as a composition of if-condition 1002 and sequential 1001 or parallel 1003 combinators.

Although shown and described with reference to FIG. 10 as comprising an exemplary combination of features for purposes of illustration only, the method for composing automations can comprise any combination of suitable features.

Additionally, the compositions themselves are assisted automations, and so this process can be applied repeatedly to get more sophisticated assisted automations.

The Intent Framework to Build Assisted Automations for Different Worlds, Controls, and Recording Formats Case where the "World" is "GUI for Desktop Computer"

In one embodiment of the intent framework, the world 115 is the desktop used by humans to interact with their operating system and the applications therein. The top three instances of such desktops are the Windows, OSX, and Linux, GUI windowing systems. The controls include but are not limited to the mouse, keyboard, and gestures. The capture of this world's state and the actions on it, can be accomplished with a screen recorder augmented with capabilities to intercept and log inputs, as well as query the desktop application for their objects and elements and their corresponding states.

The resulting assisted automation can enable desktop automations. In one embodiment, the warping interpreter described herein with an appropriate assist level reduces human manual labor, solving a problem that is called "robotic process automation". In another embodiment, the human-as-an-interpreter described herein allows the use of assisted automations as a training tool to teach users how to use desktop applications, solving a problem that is called "digital adoption platform".

Case where the "World" is "API Calls on a Computer Network"

In one embodiment of the intent framework, the world 115 is the network activity that happens behind the scenes when users interact with their computers. The controls in this case are as in the previous section. The recording now augments desktop and application activity with network activity as the user actions are captured.

The resulting assisted automations enable API automations. The API automations can work behind the scenes and can be run massively faster than human response times on desktop actions. Existing products in this space are provided by Zapier®, IFTTT®, amongst others. They suffer from a) the bottlenecks of needing to build support through explicit programming for known APIs, b) they cannot handle "implicit APIs" that are not explicitly documented, and c) they cannot build an API automation that is a user's personal desktop workflow.

In one embodiment, the intent framework can generate personal API automations, which can have the following features, but not limited to it: a) generate background automation using desktop demonstrations and no programming, b) discovery APIs even if they are not documented, or c) automations at the personal level. An embodiment of such a personal automation might be one that connects the network API calls made to a SaaS application (e.g., Salesforce®) to the operating system API used by native applications (e.g., Excel®, or OS file system) connecting cloud applications to desktop applications, in one seamless automation that can run in the background.

Case where the "World" is "Industrial Manufacturing Assembly Line"

In one embodiment of the intent framework, the world 115 may consist of activities and objects on a manufacturing assembly line operated by industrial robots. The controls are robotic arm actuators, and the recordings may consist of any sensor data that the robotic arms report.

The resulting assisted automation can be the controller code running processes on industrial robots. Typically, industrial robots are programmed manually and have fixed processes. This controller code takes a long time to develop and is not adaptable. Using the intent framework, the method described herein can enable iteratively improving actuator arms.

Case where the "World" is a "Transportation Network"

In one embodiment of the intent framework, the world 115 includes but is not limited to activity on the road network, which includes pedestrians, signs and signals, other vehicles, weather. The controls are the steering wheel, accelerator, and brake of the car the human is in. Recordings can be built using image and other sensor data.

The resulting assisted automation can be the controller for a self-driving car. Using the intent framework an iteratively improving controller for self-driving cars could be built.

Case where the "World" is a "Flight Network"

In one embodiment of the intent framework, the world 115 includes but is not limited to activity in flight, and the controllers include the flight controls. Recordings can be the flight operation of a pilot, with augmented data from flight sensors. The resulting assisted automation can be an iteratively improving controller for self-piloting planes.

The Intent Framework Applied to Desktop Automations: System for Building Assisted Automations Using Desktop Recordings Warpdrive: From Screen Recordings to Automations As an exemplary embodiment, Warpdrive can be an operational system that utilizes the intent framework to build a desktop automation system. This system can be useful for automating tasks done routinely by enterprise back-office departments, e.g., Operations, Human Resources, Finance, Legal, Procurement and Supply Chain, Customer Success and Support, Marketing and Sales, and/or Accounting.

An exemplary use case can be in tasks that involve legacy native desktop systems (e.g., desktop Electronic Health Records (EHR) software, accounting software, amongst others), or access browser-based SaaS applications, or do text spreadsheet and related tasks on native desktop applications (e.g., Excel®, Notepad, amongst others). In some embodiments, moving data across these systems or doing transformations on the data typically requires manual human work. This can be automated using Warpdrive.

Robotic Process Automation (RPA) software exists that provides rudimentary capabilities to build such desktop automations. Examples of such products are those provided by UI Path®, Automation Anywhere®, Blue Prism®, etc. Without the Intent Framework described herein though, the state-of-the-art to go from tedious task to automation can involve between one and six months of programming the automation using RPA experts and consultants, whose human-labor costs can run up to $20,000-$500,000 per automation. Using Warpdrive, the same can be done in the timespan of hours or days, and with no programming required by algorithmically turning recordings into code.

Digital Adoption Platform (DAP) software exists that provide rudimentary capabilities to build tutorials for applications or workflows. Examples of such products include WhatFix®, WalkMe®. They are typically limited to a single application and to the browser, so workflows typically do not span applications and may not describe native applications. Without the Intent Framework described herein, creating a DAP can take weeks of manual annotation, and may even involve programming (e.g., in CSS/HTML and/or Javascript). Using Warpdrive, DAPs can be within the timespan of minutes to hours, with no programming, and they can span multiple applications including native desktop applications.

Warpdrive in Operation: Record, Share, Execute (Assist, or Warp)

As an exemplary embodiment, the illustrated Warpdrive system is over a Windows® 10 desktop, but its operation is identical across any desktop OS (e.g., Mac OSX®, Linux).

On-Screen Prompts

Figure 17:
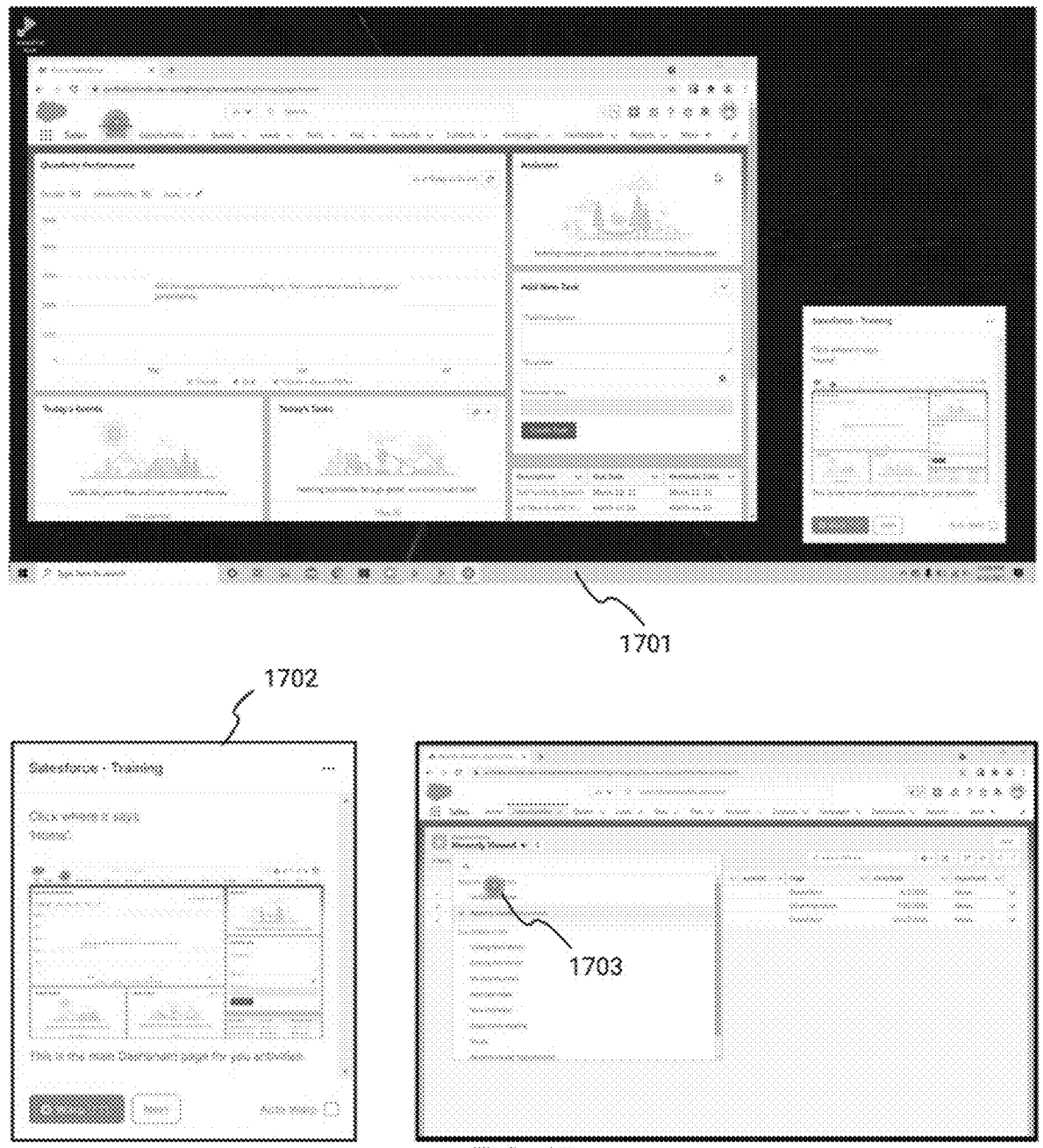
FIG. 17 are screen shots illustrating an exemplary embodiment of execution of an assisted automation with the human-as-an-interpreter method.

FIG. 17 illustrates candidate ways in which on-screen prompts may be presented to the user. Warpdrive can present the user with on-screen prompts 1702 on their desktop 1701. There can be two components to these prompts, an instruction panel, and an on-screen pointer, but not limited to it.

In the drive-assist mode, the human can be guided with an on-screen descriptive prompt and an optional additional contextual chevron, or other visually evident pointer, that can point at the object in the world that the interpreter wants the human to interact with. When the human performs the action, the interpreter can auto-detect that action and auto-advance to the subsequent step. In another embodiment, the interpreter can execute the actions on the human's behalf resulting in a completely automated execution.

The Instruction panel 1702 can stay on top of other windows and, in selected embodiments, can include one or more of the following: A) In one embodiment, information to direct the human to perform the task: a) machine-generated, human-readable prompt, b) human-added descriptive annotations such as screenshots, rich text descriptions (e.g., using markdown), audio and video narration, amongst others. B) In one embodiment, information and metadata associated with automation, e.g., automation name. C) In one embodiment, controls to edit the prompt: a) Make the prompt AutoWarp-able, b) Hide/Skip the prompt, c) Add descriptions and/or rich media, without limitation. D) In one embodiment, controls for the interpreter: a) "Warp" to execute the prompt on behalf of the human, b) "Next" for manually advancing to the next prompt, which in most cases should not be needed because of the auto-advance feature, without limitation.

On-screen pointer 1703 can be a visible pointer drawing attention to the element on screen that the automation is expecting the user to interact with.

Although shown and described with reference to FIG. 17 as comprising an exemplary combination of features for purposes of illustration only, the method for showing on-screen prompts can comprise any combination of suitable features.

Figure 18:
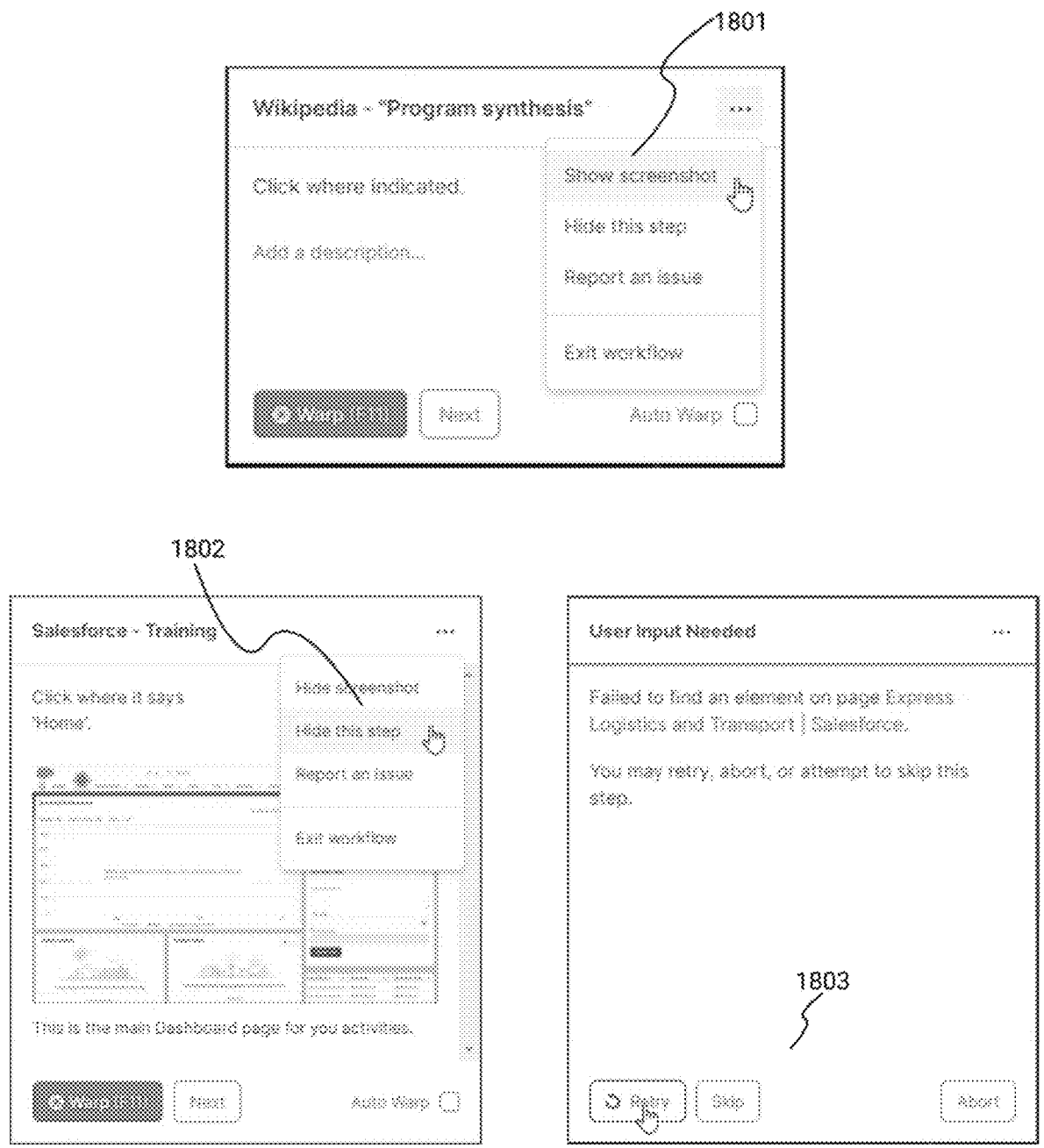
FIG. 18 comprises a plurality of screen shots illustrating an exemplary embodiment of making prompts for guiding assisted automations descriptive by adding screenshots, audio narration, rich text descriptions, and additionally annotating them to be hidden or auto-run, or breakpoint, and for error recovery with Abort, Retry, Skip during execution.

In one embodiment, prompt editing features can be enabled inline during execution of the automation as illustrated in FIG. 18. These can include adding rich media (which can include screenshots) 1801, toggling AutoWarp and hide 1802, amongst others. The prompt area can also be the location that shows automation recovery options (such as "Skip", "Retry", "Abort") 1803 in case the desktop state does not match the automation's expectation. This can happen for instance if the automation expects to interact with the SaaS application, but the login-wall has not been cleared yet. In this case, the automation can suggest to the user to login and retry.

Although shown and described with reference to FIG. 18 as comprising an exemplary combination of features for purposes of illustration only, the method for prompt editing can comprise any combination of suitable features.

In another embodiment, prompt editing can be done at the automation level using a visual UI that can allow the user to look at the entire prompt set together, as well as edit the prompt without executing the automations.

Dashboard: Repository of Organizational Knowledge

When taken across multiple users, who can be part of a team or organization, all assisted automations that are built together can be viewed as a shared repository of organizational knowledge. This knowledgebase is not only instructive, it can be executable, both by new and existing team members but also as a completely automated machine-assistant. The completely automated execution, i.e., runs using the warping interpreter at assist level 0, can happen either in the background on local desktops or in the cloud. They can also be run sequentially or in parallel.

Viewed this way, in one embodiment the repository of assisted automations can be an auxiliary workforce that can complement a human team, executing automatically and only requiring inputs as needed.

Figure 19:
FIG. 19 is a screen shot illustrating an exemplary embodiment of organizing automations in a searchable folder style layout. Libraries can be created using such folder organization to aggregate related automations.

The method described herein can have a dashboard to view this repository as illustrated in FIG. 19. It can include a search feature 1901 that can locate automations based on apps they use within, their description 1902, actions they encapsulate, users who have run them 1903, the creator 1904, date 1905, amongst other search criterions. Optionally, there could also be tags associated with automations that help locate and organize automations. The dashboard can also include ways of categorizing automations using a folder structure 1906. These folders can be explicitly built by the team or admins, or they can be smart folders constructed automatically based on certain characteristics of the included automations.

Although shown and described with reference to FIG. 19 as comprising an exemplary combination of features for purposes of illustration only, the method for an organizing workflows can comprise any combination of suitable features.

Sharing Automations: Executable Over any Desktop, Even in the Cloud

An assisted automation can capture intent and can be general enough to run on any arbitrary desktop. This can include different desktop configurations (e.g., desktops that are differently configured by different users), OS versions (e.g., Windows 7 vs Windows 10), OS types (e.g., Mac OSX vs Microsoft Windows), local or remote desktop in the cloud.

Figure 20:
FIG. 20 comprises a plurality of screen shots illustrating an exemplary embodiment of assigning a sharable identifying link for an automation.

An exemplar side-effect of this is portability of automations is that they can be shared the same way people share documents as illustrated in FIG. 20. Warpdrive can associate a unique identifier to assisted automations, which can be shared across any medium. For instance, it could be emailed, sent on messaging platforms (e.g., Apple Messages, Slack, Facebook Messenger), stored in text or documents, without limitation. This identifier can be a URI 2001 but not limited to it. Automations as described herein are compiled text programs, and thus they can be moved and shared across different machines. As shown herein, it can be possible to assign them a universal resource locator (URL) that can be used to access them from anywhere there is an internet connection. Additionally, it may be possible to define a team that has access to a group of shared automations, using the sharable URLs. Automations built on any one machine are generalized and available to run anywhere else.

When a recipient user activates this identifier (e.g., by clicking on the URI), the Warpdrive application can open the assisted automation, and the user can run it on their platform of choice. Shared automations can be organized together in a Team shared library 2002 on the Dashboard.

Although shown and described with reference to FIG. 20 as comprising an exemplary combination of features for purposes of illustration only, the method for sharing automations can comprise any combination of suitable features.

Figure 21:
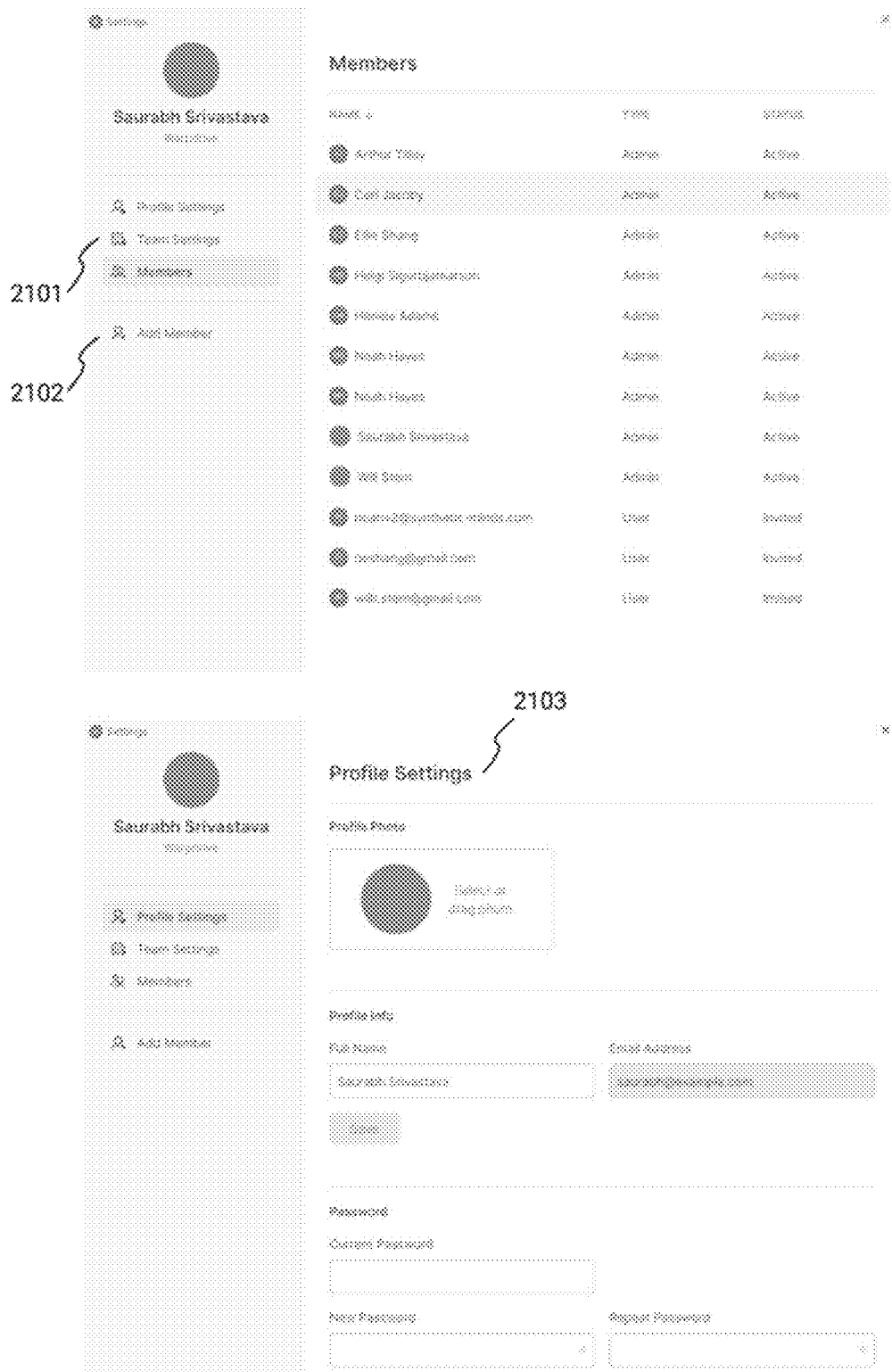
FIG. 21 comprises a plurality of screen shots illustrating an exemplary embodiment of using access controls within a team to define who owns automations, who is authorized to run them, and change their properties.

With sharing across users enabled it can be helpful to organize users into teams as illustrated in FIG. 21. The illustration presents a candidate way in which teams and individual profiles may be organized. Warpdrive can include features to create teams 2101, invite and manage team members 2102, and for team members to have profiles 2103 that identify them.

Although shown and described with reference to FIG. 21 as comprising an exemplary combination of features for purposes of illustration only, the method for team-based sharing of automations can comprise any combination of suitable features.

Execution History, Access Privileges, Description, Applications Used

Figure 22:
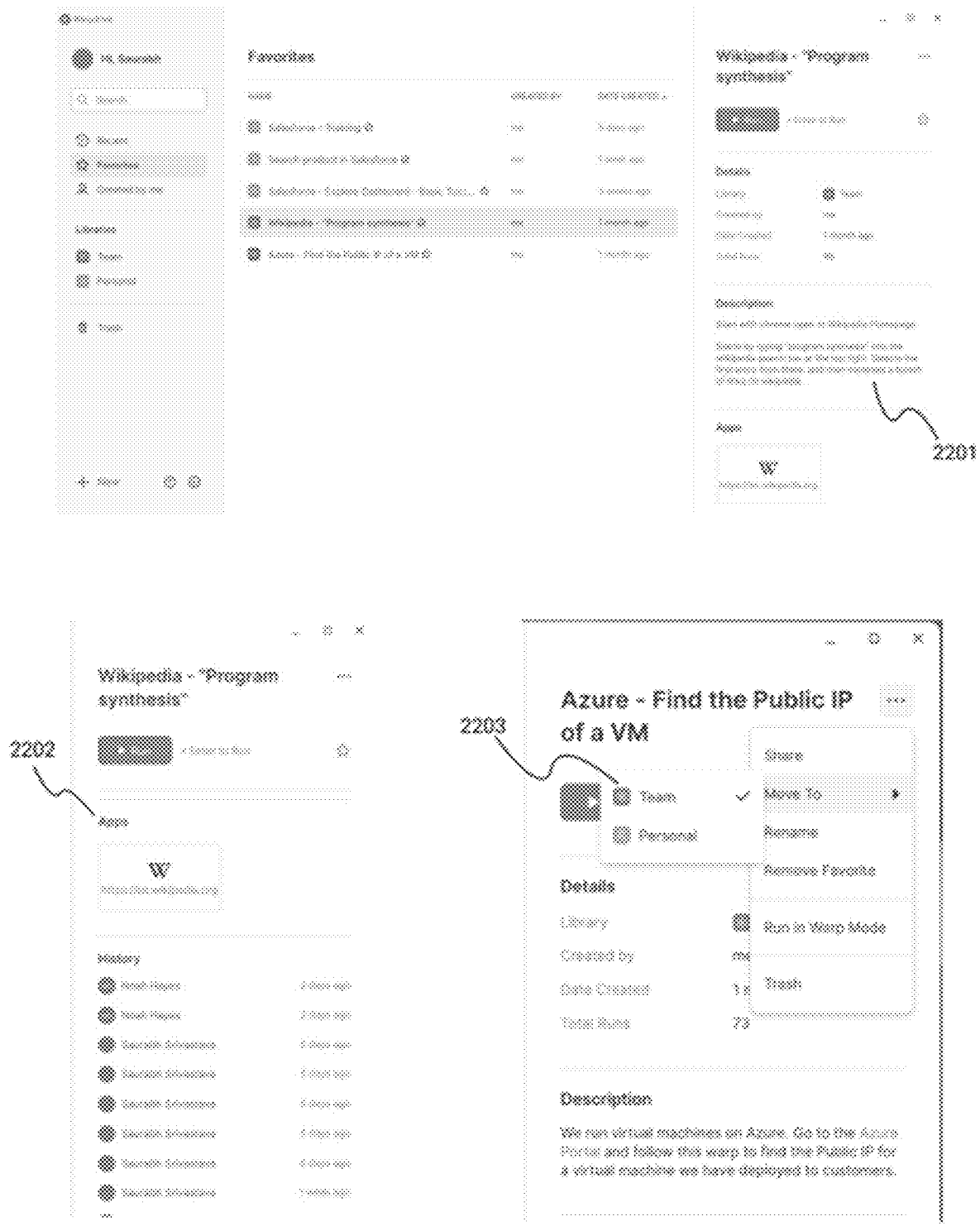
FIG. 22 comprises a plurality of screen shots illustrating an exemplary embodiment of annotating automations with descriptive metadata to identify its operations. Automations can have their list of applications accessed, their history, and access privileges metadata associated with them.

To facilitate productive use of assisted automations, it can be helpful to keep metadata on them as shown in FIG. 22. This can include access controls, which define who can create, augment, and/or execute the automation. Descriptions 2201 are useful to summarize what the assisted automation accomplishes, and these can be human annotated (e.g., using markdown text) or automatically mined from the assist program, e.g., the applications that the automation invokes and/or accesses 2202. With descriptions and access control it is possible to create folders such as "Team" 2203, without limitation, so other users can access shared automations. A log of the run history of automations can be provided as well.

Although shown and described with reference to FIG. 22 as comprising an exemplary combination of features for purposes of illustration only, the method for associating metadata with automations can comprise any combination of suitable features.

Recorder

The recorder in the intent framework can be sophisticated in its operation as described earlier. Yet, an exemplary feature of the framework is that its interaction model with the user can be identical to simpler "dumb" recorders. Warpdrive embodies that simplicity, and its recorder can look very similar to what users are accustomed to. It can ask for a name, either at the start or end of the recording. Then it can switch to record mode and display an on-screen widget with controls for stopping, pausing, or aborting the recording. It can include helpful information such as the time recorded, and/or any other information that might be helpful during recording.

Use Case for Reducing Manual Labor, and Training

In one exemplary embodiment, Warpdrive can enable desktop automations, with varying assist levels. It can fit in seamlessly and is a unique system that embeds an assistant automator behind the scenes of a user's normal desktop operations, while allowing them to share their knowledge work with coworkers in a portable way.

Reducing Manual Labor: Robotic Process Automation

One exemplary embodiment of using Warpdrive in practice can be for reducing manual tasks done by knowledge workers on their desktops. They typically access multiple applications, which can be browser-based SaaS applications (e.g., Salesforce®, Health EHR, Zendesk®, Gusto, Gainsight®, Dropbox®, GSuite® Docs/Sheets/Calendar, Wikipedia, Google Search, amongst others) or native desktop applications (desktop Health EHR, Quickbooks®, Dropbox® or Box, File Explorer®, Excel®, Word®, Keynote®, amongst others) and/or custom in-house applications, without limitation.

Warpdrive can shorten the time to create assisted automations from weeks/months to hours/days by creating automations immediately from the recording (i.e., the specification). Warpdrive may not require programming, while other products may require an army of developers to create and maintain which increase the cost many orders of magnitude beyond what it costs with Warpdrive. Additionally, the intent framework may allow for immediate rollout (after a single recording), and the automation can be self-learning so gets more robust with usage.

Training: Digital Adoption Platform

One exemplary embodiment of using Warpdrive in practice can be to train employees on digital platforms and processes. Such training tools are called "Digital Adoption Platforms" and can take up to weeks to set up and customize and require annotations which might require programming.

Warpdrive can shorten the time to create DAP tutorials, by creating workflow and using the human-as-an-interpreter with auto-advance (to track user progress on individual applications and processes) and run history (to track training coverage).

Warpdrive: An Instantiation of the Intent Framework

Warpian: Intent Language for Desktop Semantics

Warpdrive can include an intent programming language designed for specifying UI interactions, called Warpian. Warpian can be designed to be easily generated (i.e., as a target language from a compiler backend), as well as easy to read and write by a human. There features of the language that can allow Warpian programs to be generated and executed by a machine, as well as concisely read by humans. The language can have platform agnostic abstractions that do not concern themselves with low-level details of each individual UI library or platform. The language can have per-platform modules that precisely specify how each UI action can be performed on any given platform.

In one exemplary embodiment, Warpian can be a DSL for defining UI intent. Because not all UI actions may be compilable to intent (e.g., an unexplained click on some part of an application), it can contain fallback constructs to wrap UI actions. In most reasonable desktop recordings, it should be possible to compile desktop UI actions to high-level intent statements in Warpian. In most cases, the Warpian program may only contains high-level intent statements like "call invoke on button Close", rather than low-level actions like "click location (245, 234)". The language can be Lisp-like with constructs expected of a general-purpose language including control flow, variable bindings, functions, etc. It can be typed, and a type-checker can ensure conformance to the type-system so developed.

For the language, important design constraints may exist for it to be viable: a) Warpian is preferably symbolically executable, which is important to enable synthesis of programs within the language; and/or b) it is preferably expressive enough to declaratively define UI interactions through an extensible module system, without limitation.

The appendix "Warpian DSL modules" describes three different modules relevant to desktop UIs: statements describing browser operations, statements describing UI interactions, and the standard library. Table 1 shows an illustrative example of a program in Warpian.

TABLE 1

```
(def
    main
    (fn
        [input]
        (do
            (ui/invoke
                :element
                (ui/element-get
                    :element
                    (ui/element-find-all
                        :element
                        (ui/element-find-all
                            :element
                            (ui/get-root-element)
                            :properties
                            [{"Name" "Notepad"}])
                        :properties
                        [[{"Name" "Close"}]])))))
```

Warpdrive's Runtime Execution model and the Warpian Interpreters

The Warpian runtime can have two main modes of operation (as well as a hybrid of the two modes) to facilitate automated execution and prompting the human to execute the step as directed.

Current World State as Input to Warpian Interpreters

For executing a statement in Warpian, the runtime can examine the current state of the world and evaluate that state against the expectation as set in the language statement. For example, an 'ui/element-final-all' declaration in the statement can be evaluated against the current desktop state. This evaluation might throw an exception. When it evaluates error-free then the values found can be used by the interpreter to adjust the intent operation to be performed.

Warping Interpreter for Warpian

For warping, the language runtime can interpret each operation in turn, evaluating the Warpian program statement according to the semantic evaluation rules of the language, linking with a concrete execution for the target platform.

Due to the nature of Warpian declaring intent rather than low-level desktop actions, the interpreter can have the exemplary feature of being platform agnostic. A low level recorded action of clicking on '(x,y)' would not have been generalized or usable on another desktop with different resolutions or application window placement.

Additionally, the same mechanism can allow one to have an OSX® module, or a Windows® module (across different versions of either OS), or one that can translate across the platforms. Screen resolutions, layouts, windows preferences, applications or OS versions can all be abstracted away and Warpian programs can execute seamlessly across differences.

Human-as-an-Interpreter for Warpian

Figure 11:
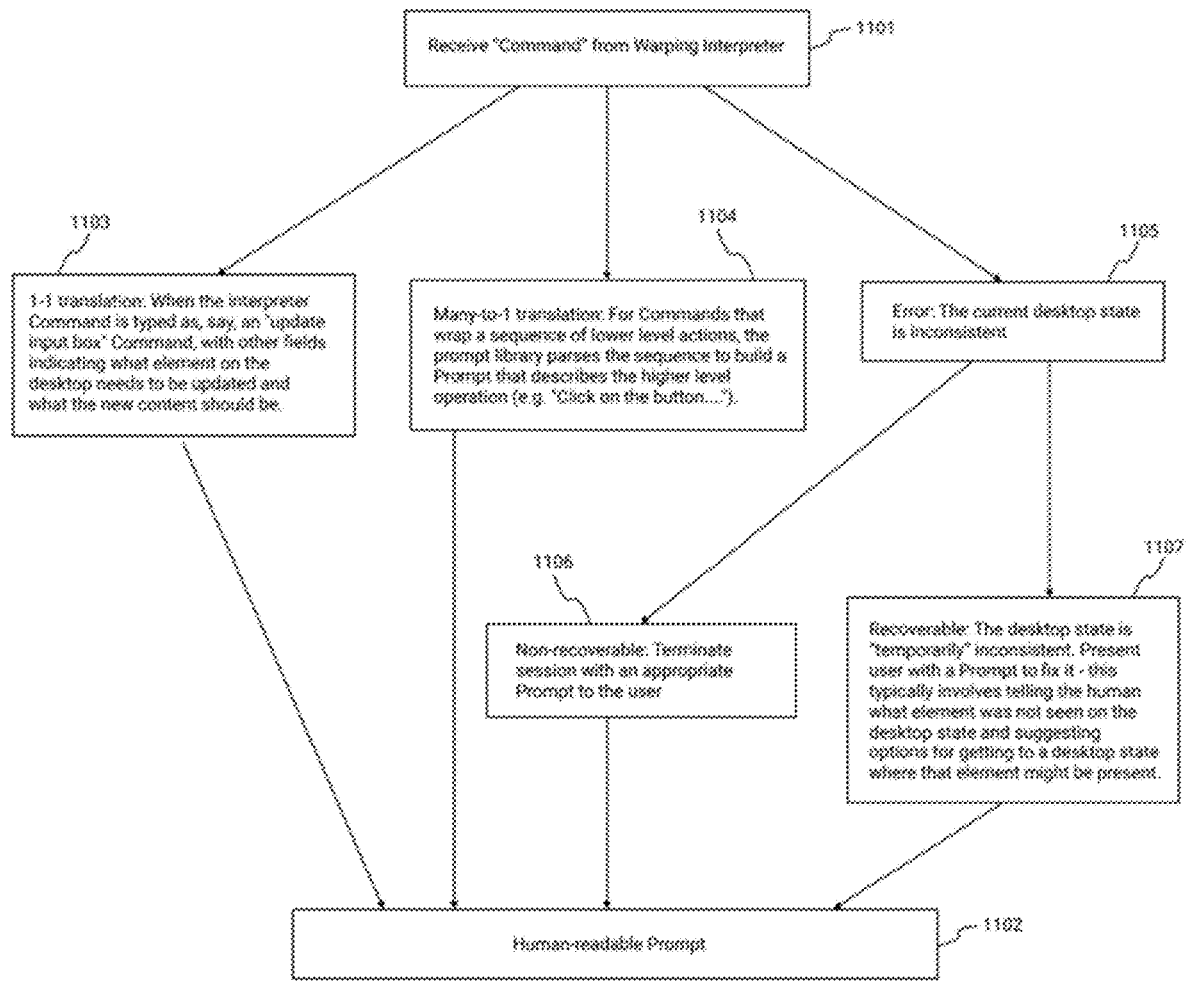
FIG. 11 is a flow chart for illustrating an exemplary embodiment of a method for prompt generation.

The human-as-an-interpreter for Warpian can be called Drive Assist. In this exemplary embodiment, the runtime can take the output of the Warping interpreter, i.e., the intent as the semantic operation, and can run a "prompt generation" algorithm. In an exemplary embodiment, the process for doing that is illustrated in FIG. 11. This prompt generation algorithm can convert the intent operation 1101 into human readable text 1102 about how to complete the operation. It can first convert 1-1 translations into prompts 1103, followed by many-to-1 translations 1104, and errors 1105, which can be of two types, non-recoverable 1106, and recoverable 1107, which can be handled in specific ways to make them reasonable for a human to read.

Although shown and described with reference to FIG. 11 as comprising an exemplary combination of features for purposes of illustration only, the method for drive-assist can comprise any combination of suitable features.

Because the recording actions can be compiled to intent, the methods described here make it possible to generate human-readable prompts. Warpdrive can display the prompt to the user on-screen. The interpreter can then wait while it a) observes the desktop state to check when the human does the operation and when they do, it "auto-advances" the program counter, and/or b) gets a "next" signal from the human and advances the program counter.

Note that the human can choose to signal "next" even without completing the operation or performing more actions than prompted. The interpreter can choose to not guard against that by design, as will be see in the next section.

Self-Learning: Observing Itself Run

The method described herein can run the recorder during drive assist. The human is allowed to deviate from the prompted script. When they deviate, the method can assume that they are doing so to adjust for differences in the world state. This can be captured as an observation during runtime. This additional recording can be used to update the assisted automation, making it more robust/intelligent. Over time, ideally there should remain no unseen scenarios that the automation cannot handle. Subsequent drive assist or warps would serve to validate the existing program rather than add refinements.

Recorder for Desktop Actions

With the language, interpreter, and runtime a user could manually write high-level programs that interact with their desktop computer in a declarative way. To automatically infer desktop actions from human interaction, Warpdrive could observe and collect system-level information in a component called the recorder. The recorder could register hooks with the operating system and synchronously route all mouse and keyboard through it.

The main goal of recording can be to gather sufficient data to allow a compiler to perform semantic inference—to translate observed mouse/keyboard events into semantically meaningful operation (e.g., click on that button, or type this word) and emit a Warpian program that captures the high-level intent of each action performed by the desktop user. Low level events like keystrokes and mouse coordinates and clicks do not carry enough information to perform semantic inference. For effective semantic analysis each low-level event can be enriched with additional information.

The additional information can be added to both "in-band" as well as "out-of-band". In-band enrichment can be fully serialized and can be collected before each user input is allowed to be processed further on the machine. The Warpdrive recorder can intercept the action, and before sending it to the world, it can serialize the (relevant local) state before the action, send the action to the environment, and serialize the (relevant local) state after the action.

Out-of-band enrichment can be supplemental events that are collected asynchronously to the user action. An example of out-of-band enrichment can be structured events reported for browser DOM interactions. These can help identify what is happening on the website. Another out-of-band enrichment channel would be one that OCRs the screen to read documents and other unstructured data that the user incorporates in their decision making or actions towards the task.

Semantic Compiler: PACC

In one exemplary embodiment, the Warpdrive compiler can be responsible for taking a recording and producing an executable program in the Warpian. The intuitive way of doing that can be to pattern match a set of low-level actions against some corresponding high-level operations. That approach may not be robust to interleaving of actions, it will get easily confused by world state differences.

Compiler to Convert Desktop Actions into Desktop Intent

Figure 12:
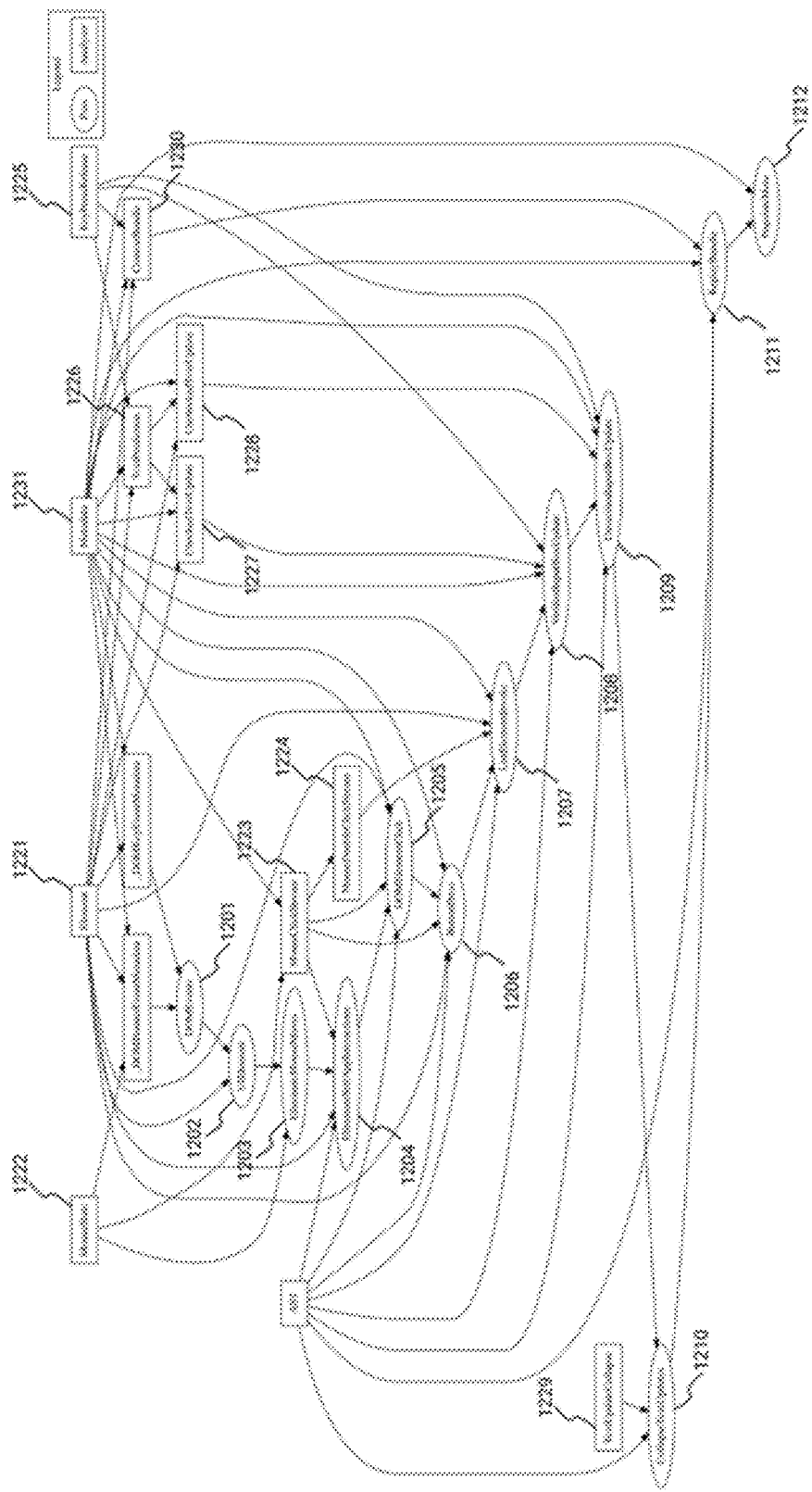
FIG. 12 is a block diagram for illustrating an exemplary organization of the various analysis and transformation passes that can make up the PACC compiler, according to one embodiment.

Instead of pattern matching, the exemplary feature described herein is to use compiler architecture to build a modular structure that incrementally lifts the abstraction level of the recording from actions until it gets to intent. A possible layout of the architecture is shown in FIG. 12.

The analysis passes can be helper modules. The transformation passes can use information generated by the analysis passes and can sequentially lift the program up the abstraction hierarchy. Below we describe the transformation passes, and the analysis passes they get information from.

DOMEvents 1201: This pass can associate browser DOM Events with their respective program node in metadata. As DOM events are out-of-band they need to be associated with the UI events that caused them to be generated. However, because they are out-of-band, this may not possible purely using timestamps as DOM timestamps may not perfectly correlate to UI timestamps. Extra information can be used along with certain algorithms to do this matching: A) Key-down/key-up to Keyboard Events: It is possible to expect a 1:1 correlation between DOM keyboard events (with down flag) to a UI element. To align keyboard events the method can use a diff-ing algorithm to search through all DOM and UI keyboard events starting from the last events and associate events wherever both events are the same key, both up/down, and the DOM keyboard event is recorded as taking place after the UI event (up to some finite time bound). Whenever the two events cannot be associated, the method can skip either the UI event or DOM event. The method can then store all possible alignments (based on what elements are not given a match) and pick the maximal matching alignment. For DOM events that remain unmatched but align with a time-matched sequence of equal number of UI events, the method can match those sequences together. B) Set pointer down/up to Pointer Events: The method can align pointer events with set pointer events in a similar fashion to typing alignment. The method can search through all alignments starting from the last events and take the best possible alignment. For these, the method can check for matches based on time, button mask, coordinates (accounting for DPI scaling factors). C) Other DOM events: There can be meta-DOM events, such as navigation. The corresponding UI event(s) can be searched, and a generalization built for these meta events.

UIElement 1202: This pass can remove intermediate updates to an input box. The Element Analyzer 1221 can provide the necessary text value information.

EliminateMouseMoves 1203: This pass can remove pure mouse moves from the program, since they are not semantically meaningful. The method can do this by using MouseState Analyzer 1222 to provide the current mouse button state. If no buttons are currently pressed, and the mouse button mask indicates move, then the method can remove the event.

ElementSelfAppInteractions 1204: This pass can eliminate all interactions with the recording system itself. Any UI operations that interact with any UI element that is tagged with the application's magic string can be removed from the output program.

DOMElementClick 1205: This pass can convert DOM element mouse clicks into DOM operations. The method can do this by recognizing a sequence of operation (mouse down followed by a mouse up using the MouseClickStream Analyzer 1223) that have been determined by DOM alignment to align with an associated DOM click event.

ButtonPress 1206: This pass can convert UI automation button presses (single presses using the MouseClickStream Analyzer 1223) into an invoke operation on an element. The method can do this by recognizing a sequence of operations (mouse down, followed by mouse up) on an element that is determined to be a button (using the Element Analyzer 1221).

ListElementInvoke 1207: This pass can convert uiautomation list element double-clicks into an invoke operation. The method can do this by recognizing a sequence of operations corresponding to a double click (mouse down, followed by a mouse up in rapid succession using the MouseDoubleClickStream Analyzer 1224) on an element that has been determined to support a double click action (using the Element Analyzer 1221).

VerifiedInputBoxUpdate 1208: This pass can interpret keyboard presses (using KeyPressReleasee Analyzer 1225) into edit boxes/documents, converting a sequence of key-down/key-up with explicit state updates in terms of value, caret position and selection (using analyzers TextPrediction 1226, CheckedTextUpdate 1227). The method can do this by predicting the value of the edit box on each key-press down based on the state information in the element or DOM event (using Element Analyzer 1221) and previous predictions. Then on each key-up the method can check if the prediction matches the observed value and if so the method can generate a text update that replaces the key-down/key-ups that were used to generate the prediction.

UnverifiedInputBoxUpdate 1209: This pass can use more conservative text predictions but does not require prediction to match observed value to generate an update (using analyzers TextPrediction 1226 and UncheckedTextUpdate 1228). The method can do this by generating edit box predictions in the same manner as VerifiedInputBoxUpdate 1228 but more conservatively—namely halting prediction on a specific edit box whenever a key is pressed that is not alphanumeric.

CollapseTextUpdates 1210: This pass can collapse consecutive text updates to the same element to a single update. The method can do this by creating a stream of text updates with the same target element and removing all but the last text update in a stream (using analyzer TextUpdateCollapse 1229).

ReplayBundle 1211: This pass can bundle any remaining low-level events together based on target elements into logical segments. The method can do this by bundling together consecutive low-level events with the same target element and a continued action. So key-ups are bundled with their respective key-down and typing streams are separated from mouse interactions. The ContextBundle Analyzer 1230 helps provide the information needed. These bundles can then be associated with their shared target element.

PopulateMeta 1212: This pass can associate metadata info provided by the Metadata Analyzer 1231 with the AST nodes themselves.

Although shown and described with reference to FIG. 12 as comprising an exemplary combination of features for purposes of illustration only, the method for compiling events in a recording to high-level intent-program can comprise any combination of suitable features.

Identifying UI elements in a robust translatable way, especially when it is desirable to go across versions, user machines, software versions, time span, is a non-trivial task. To do so, an exemplary data structure is presented, as well as algorithms to process UI elements in this representation.

Data Structures to Model UI Variability Across Installations and Versions of GUI Software A challenge with generating a program from user interactions that should work across platforms—or even on the same user's machine later is to find the right abstraction for representing UI elements. A GUI desktop can be thought of as a tree (rooted at the desktop) of graphical elements. These graphical elements consist of windows, buttons, scroll bars and so forth. Each UI element exists abstractly as a semantic element, as well as concretely as instances on the screen. For example, most mail programs have a compose button to start writing a new email, as well as a send button to send the email. But where these buttons are and what they look like varies across applications and even versions of the same application as software UI redesign moves things around.

To solve this issue, an indexed tree of UI elements can be built, and a graph database of elements, whose description will be helped by first defining a UI element instance and a semantic UI element.

UI element instance can be an observed UI element in a particular desktop in a particular application—along with all properties of the element and its spatial relationship with other element instances. A recording may be composed of these UI element instances.

Semantic UI element can be an abstraction and a higher-level concept that does not actually exist but captures the semantic intent of that element. The expectation may be that it is stable across desktops and applications, and maybe even across different versions of the application (e.g., a close button is universal).

Figure 13:
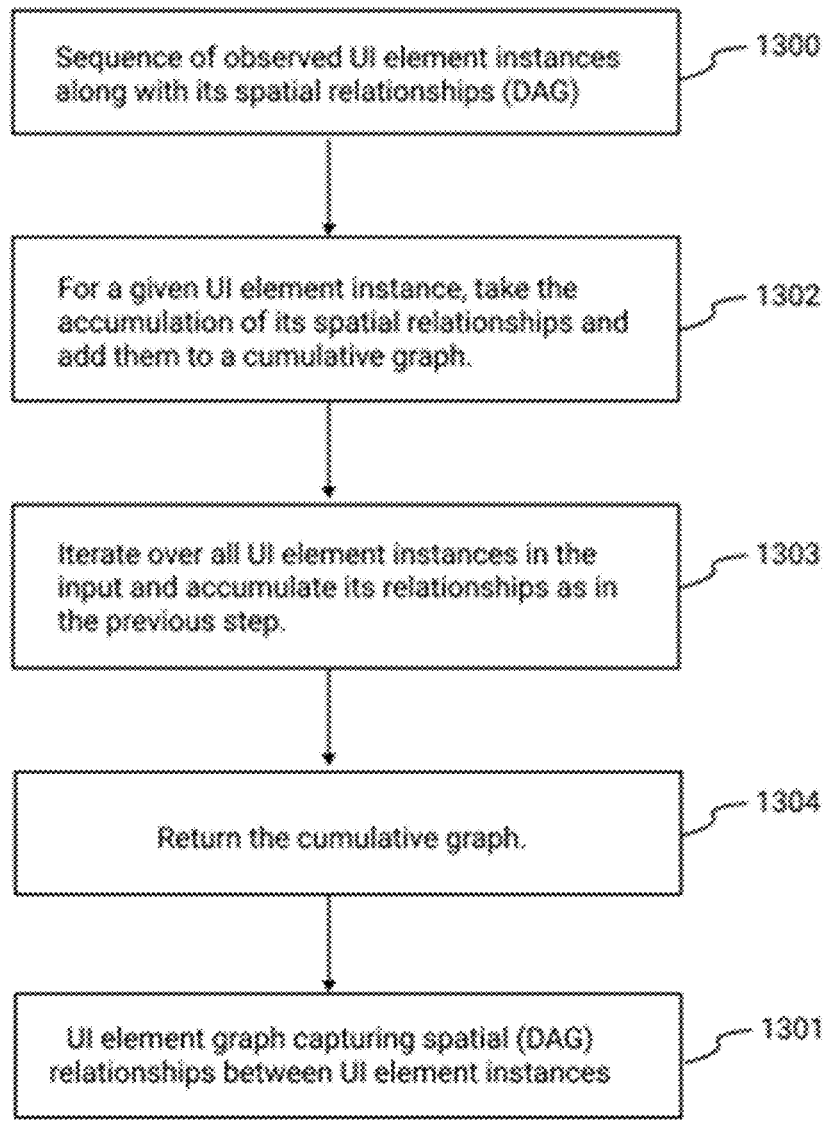
FIG. 13 is a flow chart for illustrating an exemplary embodiment of a method for building UI element relationships.

In one exemplary embodiment, semantic UI elements 1301 can be inferred through clustering from UI Element instances 1300, either from individual recordings or across multiple recordings over time (e.g., to learn common characteristics of elements and the changes in its UI over time). The process for doing that is shown in FIG. 13. A semantic UI element can be a group of UI element instances where the members of the group share some underlying semantic purpose. The first step is to accumulate the spatial relationships of a UI element 1302, iterate over all elements 1303 and return the cumulative graph 1303.

Although shown and described with reference to FIG. 13 as comprising an exemplary combination of features for purposes of illustration only, the method for identifying semantic UI elements can comprise any combination of suitable features.

Figure 14:
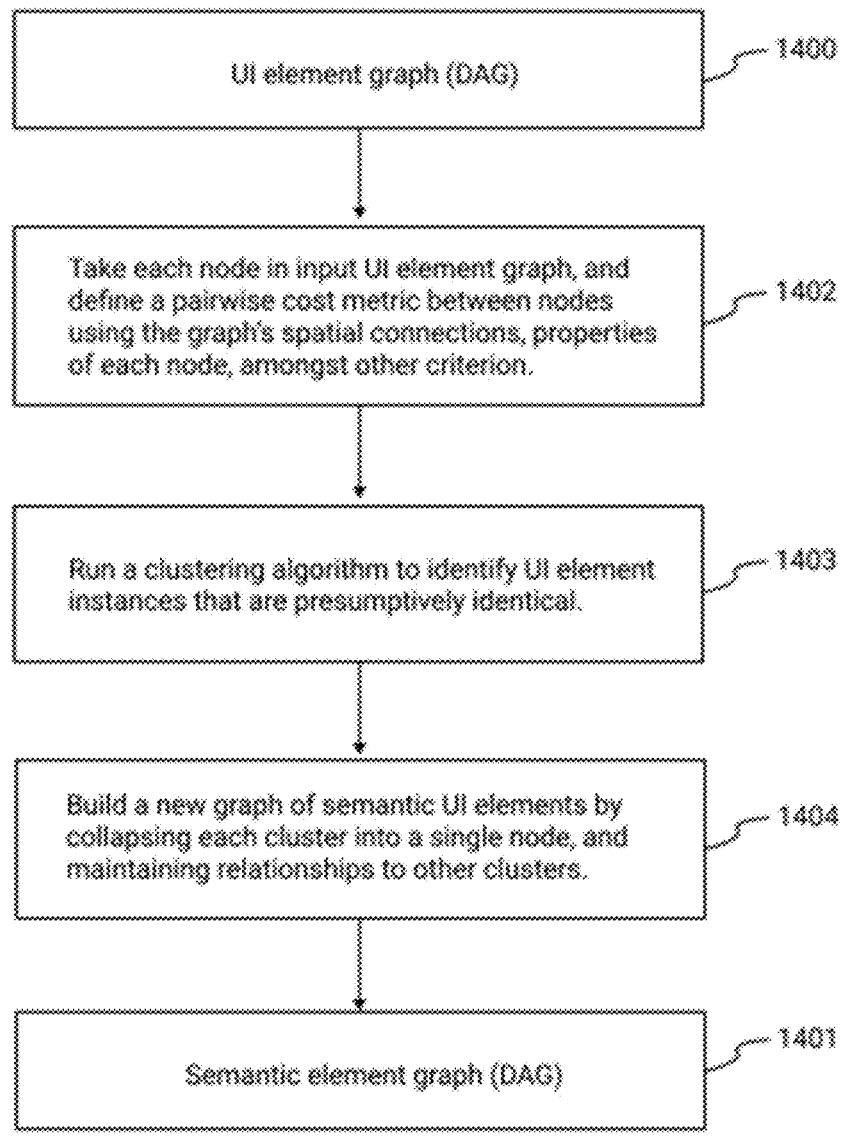
FIG. 14 is a flow chart for illustrating an exemplary embodiment of a method for building semantic UI elements that capture program intent.

From the UI element graph 1400, the method can then construct the second graph of semantic elements 1401 after nodes have been clustered. This can be done by clustering 1403 based on a pairwise cost metric 1402 based on UI element properties, followed by those clusters into a semantic element and rebuilding relationships from the underlying graph 1404. The second graph can be similar but captures higher level intent and groups nodes together. The process for doing that is shown in FIG. 14.

Although shown and described with reference to FIG. 14 as comprising an exemplary combination of features for purposes of illustration only, the method for building a UI element graph can comprise any combination of suitable features.

From a recording the method can only observe the concrete instances of an element. If the generated program specifies each UI interaction with a high degree of detail the resulting program may be very precise but not portable since minor variations in the UI can break the program (consider for example the screen position of the UI element as the property that gets captured). Conversely, if all detail is removed, and each UI element is described only in abstract terms (e.g., click on a button), then the program has lost all precision and will likely perform incorrect actions. To address this challenge, Warpdrive over time, can learn the information that is relevant to the semantic nature of an element. Concrete observations of element instances can be binned together. This allows the Warpdrive compiler to emit instructions that are precise but also tolerant against world changes.

Semantic Synthesizer for Desktop Assisted Automations

Because it is possible to run the recorder during drive assist, after every run of the assisted automation, the method described herein can have a new recording to assimilate. Assimilating new recordings creates a more robust automation, but to do so, algorithms to align recordings might be needed, create scaffolds from them, and synthesize functions to fill the holes in the scaffolds.

Before aligning recordings and the elements they contain within, it may be useful to define a third term for instance equivalence over UI elements, in addition to semantic UI elements and UI element instances defined earlier.

Instance equivalence over UI elements: Through recording, and each subsequent execution of the compiled program the method can see a new instance of every UI element that is interacted with. There is a notion of behavioral equivalence (in the context of the task being recorded) between these elements across recordings, that is distinct from the pure abstract semantic notion of this element. Consider a recording that opens two directories and moves a file from one to the other (e.g., through a drag action). In this recording, the method might see two UI element instances of the file explorer (and in fact at least two instances of each child UI element of each instance of explorer), which can be called A and B. From clustering, the method can group each of these instances (A and B) into semantic UI elements, e.g., a single notion of explorer. On each execution of the task the method can see two distinct semantic UI element file explorers again (A' and B'), which implies a relationship between every new semantic explorer that has the same behavioral purpose as A in the original recording, and similarly there is a relationship between B and B'. Here A and A' (with B and B') can be called equivalent instances. During program execution, the compiler, through the UI element graph, can maintain an instance identifier representing this equivalence class of elements.

Element Alignment

Element alignment can now be described as the act of finding an equivalence over these equivalence classes spanning multiple recordings (i.e., multiple compiled Warpian programs). To align elements, it is possible to use the theory of abstract interpretation: A) In one embodiment, it is possible to symbolically execute each program and use a simple abstract representation of the machine (through an abstraction function) to build up constraints on each element that the program interacts with. B) In one embodiment, the method can formalize a notion of equivalence of two equivalent instances, $a$ and $b$, if 1) $a$ and $b$ correspond to the same semantic UI element, and 2) every abstract operation (under abstract interpretation) on $a$ is also done on $b$ (and vice versa). C) In one embodiment, the method can synthesize new instance identifiers for both programs such that each program interacts identically with each element if they have the same instance identifier. Note here that creating a completely disjoint set of instance identifiers can trivially satisfy the constraints, so the method can add a cost component to find the minimal set of such identifiers.

The above alignment algorithm can use UI metadata. The method can extend this notion to other properties including but not limited to process identifiers, network ports, software versions, and collectively call that an element signature. Across time, desktops, users, a database of seen signatures can be created to get probabilistic matches.

Aligning all elements of a recording can align the recordings. If the recordings are identical (modulo commutativity) this step may collapse two recordings into one. This procedure can be repeated recursively until all recordings have been aligned.

Synthesis of Control Flow: Creating the Scaffold for the Program

Figure 15:
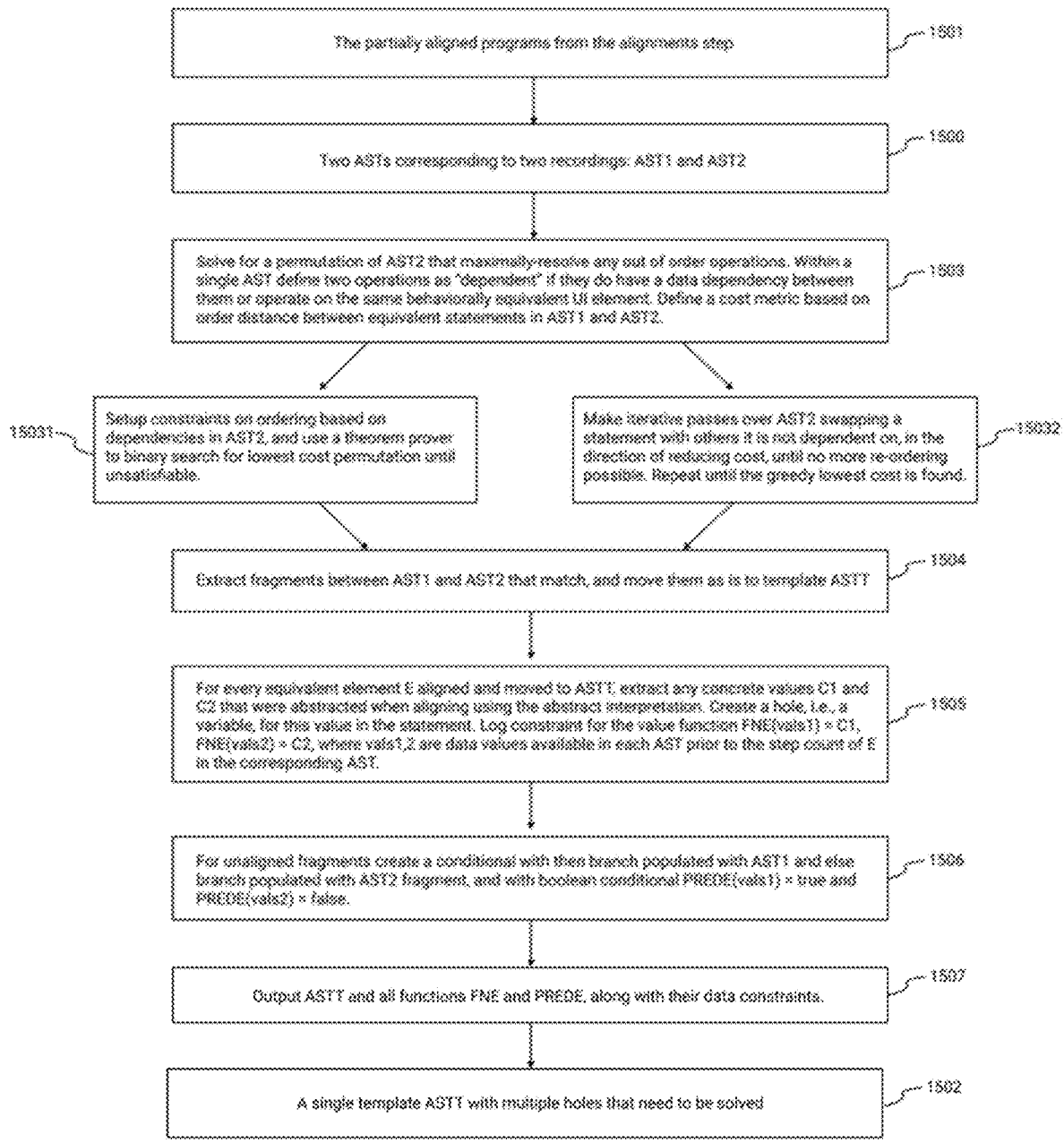
FIG. 15 is a flow chart for illustrating an exemplary embodiment of a method for creating the control flow scaffold of the assisted automation.

After the alignment, the abstract interpretation function used may have abstracted away details such as what exactly was typed into an element. In addition, if the recording was not "equivalent", it is likely that there may be actions in one that do not show up in the other recording. This step can merge both programs into a templated program that has holes for all concrete data that was abstracted away during alignment and can introduce holes for branch conditions that guard each interaction that shows up in one program and not the other. The process for doing that is shown in FIG. 15. It can convert partially aligned programs 1501 to a single template program with holes (a scaffold) 1502 using data structures for representing ASTs of recordings 1500. It can do this by solving for permutations of the second AST such that it maximally matches the first AST 1503; and this process can use a theorem prover to search for the lowest cost permutations 15031 or it can do a greedy search to find the lowest cost solution by iterative swapping 15302. Then it could extract fragments that match concretely 1504, and for any fragments that matched equivalently under the abstraction function store the concrete values as constraints 1505. For all unaligned fragments, create branches 1506. Lastly output the created AST, the concretely matching fragments, the constraints on equivalently matching fragments, and the predicates and holes created 1507.

Although shown and described with reference to FIG. 15 as comprising an exemplary combination of features for purposes of illustration only, the method for creating a program scaffold can comprise any combination of suitable features.

Optimization: Since a pair of programs can be merged into a single program, this extends to merging an arbitrary number of recordings into a single program. Doing element alignment across multiple recordings, the method can improve the performance of the algorithm.

Synthesis of Value Functions for Conditional Predicates (Booleans) and Variables Once a scaffold has been created across different recordings, the scaffold can have holes where a value is needed, and holes for conditional predicates. The holes can to be assigned a body of a function that evaluate an expression over the inputs. To do so, one can explicitly, or symbolically, set up a class of functions using a grammar for expressions. Symbolically executing this class and constraining the inputs and outputs based on the values from the scaffold creation process can yield a constraint set that if solved will give white-box code for the functions.

Figure 16:
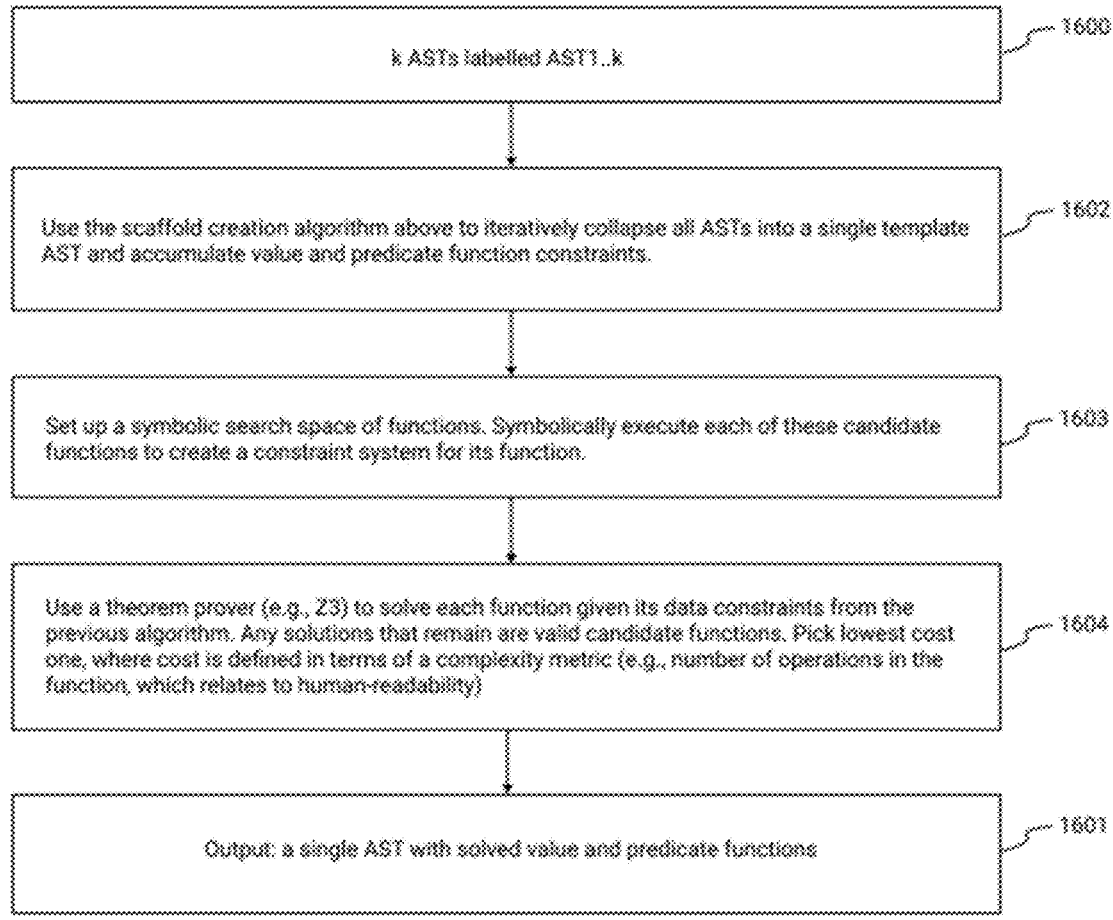
FIG. 16 is a flow chart for illustrating an exemplary embodiment of a method for solving the scaffold, to construct a generalized assisted automation.

The constraint set may be complicated to solve and may need reasoning about program constructs that are not solvable without specific decision procedures and their Boolean combination. Thankfully, there exist robust theorem provers that work well in practice. An instance of such a solver is Z3. Z3 can look for satisfiability of the constraint set, and satisfiable, query the model to extract the expressions needed. In one embodiment, the process for doing that is shown in FIG. 16. It can take as input k ASTs 1600 and outputs a single AST with value and predicate functions 1601. It can do this by collapsing multiple ASTs (using the process in FIG. 15) pairwise 1602 until a single AST remains. Then it can set up a symbolic search space by symbolically executing the AST 1603 to get constraints and finally to solve the resulting constraints using a theorem prover 1604.

Although shown and described with reference to FIG. 16 as comprising an exemplary combination of features for purposes of illustration only, the method for synthesizing value functions can comprise any combination of suitable features.

As an illustration of the outcome from this process, the recording snapshots below are from a long running recording that does multiple iterations of: going to finance.yahoo.com, looking up the price history of a stock ticker, going into excel, creating a block of cells that tabulate the 30 day movement in price, compute it as a percentage, and send an email with the difference and ticker name to a designated email address, if the movement is greater than 10%. The outcome of running the synthesis algorithm results in the output shown in Table 2, with the original ground truth (hidden, and in the user's head) shown alongside.

TABLE 2

| | |
|---|---|
| $FN11(i) = 5 + 6 * (i - 1)$ | $FN11(i + 1) = 5 + i * 6$ |
| $FN12(i) = 5 + 6 * (i - 1)$ | $FN12(i + 1) = 5 + 6 * i$ |
| $FN13(i) = 7 + 6 * (i - 1)$ | $FN13(i + 1) = 6 * i + 7$ |
| $FN14(i) = 8 + 6 * (i - 1)$ | $FN14(i + 1) = 8 + 6 * i$ |
| $FN21(i) = 5 + 6 * (i - 1)$ | $FN21(i + 1) = 5 + 6 * i$ |
| $FN22(i) = 5 + 6 * (i - 1)$ | $FN22(i + 1) = 5 + i * 6$ |
| $FN23(i) = 7 + 6 * (i - 1)$ | $FN23(i + 1) = 6 * i + 7$ |
| $FN24(i) = 8 + 6 * (i - 1)$ | $FN24(i + 1) = 8 + i * 6$ |
| $FN25(i) = 8 + 6 * (i - 1)$ | $FN25(i + 1) = 6 * i + 8$ |
| $PRED1(v) = v > 10\%$ | $PRED1(v) = v > 5\%$ |
| Ground truth of actions performed across the multiple executions | Synthesized values for the conditional function, as well as multiple $v = f(x)$. Note that because the system contains a complexity measure for expressions the synthesized expressions are simple, but not identical (e.g., commutative operations are at times reordered) Additionally the predicate synthesized implies the ground truth, but because the assisted automation had seen no recordings where the value v in (5, 10] it has no reason to pick the ground truth value of 10 over 5. Training the assisted automation further would lead to the precise ground truth being identified. |

Discovery of Workflow Fragments from Unannotated Always-on Recorder

Given a very long recording, it may be possible to enumerate subsets of the program that only pertain to a given UI element instance identifier. Let this be called a program slice. From this enumeration, it may be possible to get smaller recordings at increasing levels of granularity. At the top, there is the entire program, that corresponds to all interactions with the desktop. One level down is all operations that correspond to a single instance of an application, all the way to the bottom where there can be a lot of programs that correspond just to a single click on a single button that never showed up more than once.

The method can take all pairs of these program slices (pruning unlikely candidates by length, application, etc.). Running them through the alignment can find fragments within the program that are highly similar and put them into a correlated slices set. Looking at program slices at a chosen abstraction level and comparing all such windows pairwise at that abstraction level gives signals for discoverable assisted automations. Looking at the same but in 2D space in this diagram, i.e., program slice across abstraction levels can prune the space more.

This step can be computationally expensive, but it should be possible to prune the set of candidates before synthesis is invoked. Also note that this is highly parallelizable, the discovery can be trivially scaled by adding more compute. The groups of correlated slices identified can be sent through the compilation and synthesis process to generate suggested assisted automations.

Composing Assisted Automations

Figure 23:
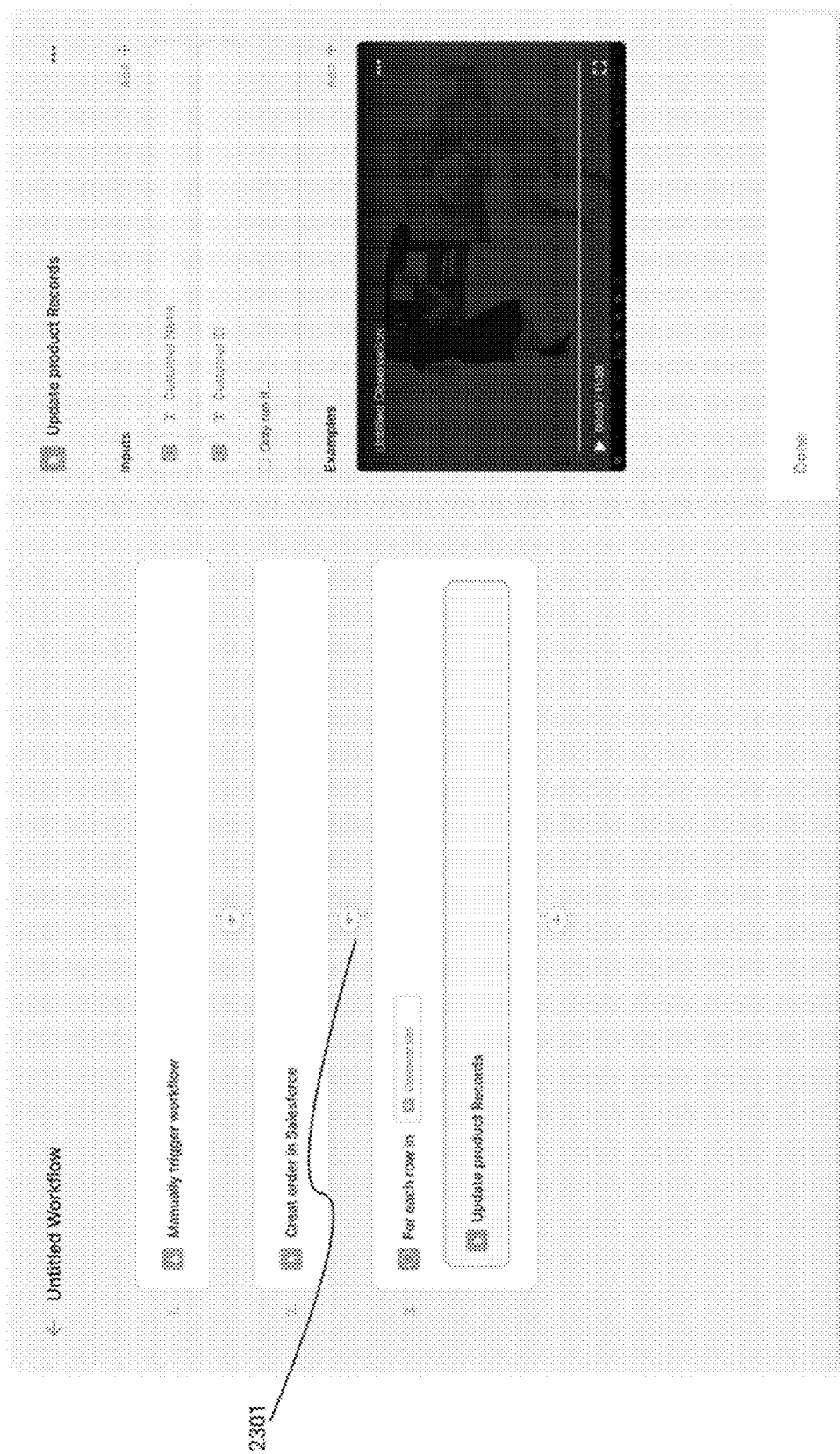
FIG. 23 comprises a plurality of screen shots illustrating an exemplary embodiment of a Warpdrive composer. Assisted automations can be viewed as block-level functions with inputs and outputs and composed together with other automations.

Assisted automations can be composed together with others as illustrated in FIG. 23. The illustration shows how there can be a visual composition panel that permits users to add steps 2301, where each step might take inputs that could come from prior steps and may produce output that could be used by subsequent steps. Each step may have a set of recordings associated with it that may allow the method presented herein to generate assisted automations for those steps. The chaining of these individual steps could lead to an expressive automation beyond what could be constructed using end-to-end recordings.

The individual components chained together could come from across machines (e.g., cloud vs local desktop), and/or across team members (e.g., to chain steps of a longer process that needs action from various stakeholders).

Although shown and described with reference to FIG. 23 as comprising an exemplary combination of features for purposes of illustration only, the method for composing assisted automations can comprise any combination of suitable features.

Orchestration of Assisted Automations: Triggers, Scheduling, Batch Runs

Orchestrated assisted automations can be run on local desktops but also on cloud machines where they would not interfere with local desktop usage.

There can be three types of orchestrations, but not limited to them: A) Triggers: In one embodiment, these automations can execute when an event triggers them. An instance of a trigger is an email received at a special email address. The automation can monitor that email address and for every email received it starts its execution, possibly using data from the trigger source to populate its input variables B) Scheduled: In one embodiment, these automations can be triggered periodically at a designated time. C) Batched: In one embodiment, an assisted automation can be replicated to run over a dataset. These runs can be scheduled to run in parallel on different virtual machines (locally or in the cloud), or sequentially (locally or in the cloud)

RELATED ART

Warpdrive and the Intent Framework can have the ability to: A) Build assisted automations from a single recording, B) Build concise white-box code that has control flow and tracks a time varying world state to interact autonomously with it, C) Iteratively improve the automation by observing itself run, D) Use of human-as-an-interpreter through understandable prompt construction.

Other products or systems are not known to possess these features. The sections below cover adjacent technologies that put the nature of the Intent Framework and Warpdrive system in context of the state-of-the-art.

Systems, Techniques, and Products with Adjacent Technologies

Synthesizing Side-Effect Free Macro Functions: Microsoft® Excel®'s FlashFill

Microsoft's FlashFill features synthesizes side-effect free functions from input-output examples. The method described herein is different, in that it 1) iterative self-learns instead of doing batch synthesis, 2) the learning and execution model is richer (i.e., world states) rather than the deterministic macro framework of Microsoft's Office Suite, 3) handles temporally varying data and has algorithms that account for that, 4) builds automations from recordings rather than static data.

Recorders in RPA: UIPath®'s TaskMiner®, Automation Anywhere®'s Discovery Bot®, Celonis®' Process Miner®

Robotic process automation products have recorders and claim to discover tasks and processes. Usable automations are hard to create directly from recorders, but instead most alternative methods create heat maps that serve as documentation for the RPA developer to use as specification for the automation to be programmed. UIPath's TaskMiner, Automation Anywhere's Discovery Bot, and Celonis' Process Miner, are illustrative examples of such known tools.

Deep Networks: OpenAI®'s GPT3®, Tesla® SDC, DeepMind®

Deep neural networks can be envisioned to attempt to solve the problem of "learning an automation". Such an approach could create a black-box, probabilistic automation that would need millions of data points to train that will fail or give imprecise instructions under most runs, even if potentially many orders of magnitude more recordings were used than in the framework described herein.

In selected embodiments, one or more of the features disclosed herein can be provided as a computer program product being encoded on one or more non-transitory machine-readable storage media. As used herein, a phrase in the form of at least one of A, B, C and D herein is to be construed as meaning one or more of A, one or more of B, one or more of C and/or one or more of D.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

APPENDIX

Warpian DSL Modules

Browser Statements (dom.sm)

TABLE 3

; A click on a dom element. The xpath is the dom element selector derived from
; the "raw" target data
(spec click [(:browser UIElement) (:xpath str)] -> nil)
; Set the state of an input box.
; :browser is the UI element with DOM that was edited
; :xpath is the DOM xpath to the edited input box
; :value is the updated string value of the input box
; :caret-position is the 0 based index into the value
; :selection is the selection (if any) in the input box
(spec update-input-box [(:browser UIElement)
  (:xpath str)
  (:value str)
  (:caret-position int)
  (:selection str)] -> nil)
; Emit a series of events with the given DOM element focused
; Takes as arguments:
;   UI element to set focus to
;   String xpath indicating the DOM target to set focus to
;   List of ASTNodes to execute after focus has been set
(spec with-focus [UIElement str & any] -> nil)

UI Interactions (ui.sm)

TABLE 4

```
; An object representing a GUI element.
(spectype UIElement)
; An object representing a set of GUI elements.
(spectype UIElementSet)
; Query and return the root element
(spec get-root-element [ ] -> UIElement)
; Get an element from given search parameters
(spec get-element [(:parent UIElement)
    (:id int)
    (:control-type keyword)
    (:properties map)] -> UIElement)
; Search for an element, one level down, from a set of elements matching
a
; properties.
(spec element-find-all [(:element (s/union UIElement UIElementSet))
(:properties [& map])] -> UIElementSet)
;; Return the highest ranked element in an UIElementSet
(spec element-get [(:id int) (:element UIElementSet)] -> UIElement)
; Set the current keyboard focus to a given keyboard-focusable element.
(spec set-keyboard-focus [(:element UIElement)] -> nil)
; Invoke the default action of an element (click, double click, etc ...)
; :element must be a UI element that implements the Invokable pattern
; :method indicates the method used for invocation (:click, :doubleclick,
etc ...)
(spec invoke [(:element UIElement) (:method keyword)] -> nil)
; Set the state of an input box.
; :element is the edited input box UI element
; :value is the updated string value of the input box
; :caret-position is the 0 based index into the value
; :selection is the selection (if any) in the input box
(spec update-input-box [(:element UIElement)
    (:value str)
    (:caret-position int)
    (:selection str)] -> nil)
; An operation that copies the current selection (implementation can emit
; ctl+c)
(spec copy [ ] -> nil)
; Read the current value of the clipboard
(spec get-clipboard-value [ ] -> str)
; Read the current desktop resolution
(spec get-current-resolution [ ] -> {:width int :height int})
; Emit a key down
; if key is standard unicode, dbg will be that string. Otherwise
; the dbg will be the keyword of that key enum.
```

TABLE 4-continued

```
(spec set-key-down [(:key int) (:special bool) (:dbg (s/union str
keyword))] -> nil)
; Emit a key up
(spec set-key-up [(:key int) (:special bool)] -> nil)
; Update the pointer state (move the mouse, ...)
(spec set-pointer [(:x int) (:y int) (:button-mask int)] -> nil)
; Emit a series of events with the given element focused
; Takes as arguments:
;    UI element to set focus to
;    List of ASTNodes to execute after focus has been set
(spec with-focus [UIElement & any] -> nil)
```

Standard Library (stdlib.sm)

TABLE 5

```
; Spec for the main function
(spec main [map] -> map)
; Fails if the provided condition is not true.
(spec assert [bool] -> nil)
; Returns true if all of the provided arguments are equal, false otherwise
(spec = [& any] -> bool)
; Adds all of the numbers together, returning an int
(spec + [& int] -> int)
; Subtracts the numbers, (- 1 2 3) -> (1 - 2 - 3). Returns an int.
(spec - [& int] -> int)
; Multiplies the numbers, (* 1 2 3) -> (1 * 2 * 3). Returns an int.
(spec * [& int] -> int)
; Returns true if the first argument is less than the second argument.
(spec < [int int] -> bool)
; Coerces a value into a string.
(spec to-str [any] -> str)
; Returns the negation of its boolean argument (true -> false, false -> true)
(spec not [bool] -> bool)
; Return the conjunction of its arguments. If the argument list is empty
return true.
(spec and [& bool] -> bool)
; Return the disjunction of its arguments. If the argument list is empty
return false.
(spec or [& bool] -> bool)
; Try to parse a value into an integer. (E.g., (parse-int "1") -> 1)
(spec parse-int [any] -> int)
; Returns the value at the nth index of the vector. (E.g., (index [1 2 3]
1) -> 2)
(spec index [vector int] -> any)
; Returns the concatenation of the strings passed in
(spec concat [& str] -> str)
```

Example Program in Warpian

TABLE 6

```
(def
 main
 (fn
  [input]
  (do
   (let
    [desktop ^2132913980298452141 (ui/get-root-element)]
    (do
     ^{"derived" [140027431429744 140027431430560], "info" {"description" "", "title" "Wikipedia, the free
encyclopedia", "url" "https://en.wikipedia.org/wiki/Main_Page"}, "id" 18306685439896180108}
     (dom/click
      :browser
      ^5955622028456753500 (ui/element-get
       :element
       ^5808177786417118292 (ui/element-find-all
        :element
        ^3457548146867895629 (ui/element-find-all
         :element
         desktop
         :properties
         [{"ControlType" "PaneControl"
           "ClassName" "Chrome_WidgetWin_1"
           "FrameworkId" "Win32"
           "IsContentElement" true
           "IsControlElement" true
```

TABLE 6-continued

```
            "IsKeyboardFocusable" false
            "IsPassword" false
            "Name" "Wikipedia, the free encyclopedia - Google Chrome"}])
         :properties
         [{"ControlType" "DocumentControl", "ClassName" "Chrome_RenderWidgetHostHWND",
"IsContentElement" true, "IsControlElement" true, "IsKeyboardFocusable" true, "IsPassword" false}])
         :id
         0)
         :xpath
         "(((((((//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[2])/div[@id='p-
search']|(((//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-
navigation']|//html[1]/body[1]/div[5])/div[1])/div[2])/div[1])/form[@id='searchform']|(((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[@id='simpleSearch']|(((((//html[1]/body
[1]/div[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[@id='searchform']|(((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[1])/input[@id='searchInput']|(((((((//html
[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[2])/div[@id='p-
search']|(((//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-
navigation']|//html[1]/body[1]/div[5])/div[1])/div[2])/div[1])/form[@id='searchform']|(((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[@id='simpleSearch']|(((((//html[1]/body
[1]/div[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[@id='searchform']|(((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[1])/input[1])"
```

TABLE 6-continued

```
^{"derived" [140027430946416], "info" {"description" "", "title" "Wikipedia, the free encyclopedia", "url"
"https://en.wikipedia.org/wiki/Main_Page"}, "id" 18109402980764670437}
            (dom/update-input-box
              :browser
              ^10881012765773431418 (ui/element-get
                :element
                ^644014455859901544 (ui/element-find-all
                  :element
                  ^2394081783237015419 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "Wikipedia, the free encyclopedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                id
                0)
              :xpath
              "(((((((((//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[2])/div[@id='p-
search']|(((//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-
navigation']|//html[1]/body[1]/div[5])/div[1])/div[2])/div[1])/form[@id='searchform']|((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[@id='simpleSearch']|(((((//html[1]/body
[1]/div[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[@id='searchform']|((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[1])/input[@id='searchInput']|(((((((//html
[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[2])/div[@id='p-
search']|(((//html[1]/body[1]/div[@id='mw-navigation']|//html[1]/body[1]/div[5])/div[@id='mw-
head']|(//html[1]/body[1]/div[@id='mw-navigation']|//html[1]/body[1]/div[5])/div[1])/div[@id='right-
navigation']|(//html[1]/body[1]/div[@id='mw-navigation']|//html[1]/body[1]/div[5])/div[@id='mw-
head']|(//html[1]/body[1]/div[@id='mw-
navigation']|//html[1]/body[1]/div[5])/div[1])/div[2])/div[1])/form[@id='searchform']|((((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[@id='simpleSearch']|(((((//html[1]/body
[1]/div[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|(//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
```

TABLE 6-continued

```
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[@id='searchform']|(((//html[1]/body[1]/div
[@id='mw-navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[@id='p-search']|(((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[@id='right-navigation']|((//html[1]/body[1]/div[@id='mw-
navigation']|//html[1]/body[1]/div[5])/div[@id='mw-head']|(//html[1]/body[1]/div[@id='mw-
navigation']|//html[1]/body[1]/div[5])/div[1])/div[2])/div[1])/form[1])/div[1])/input[1])"
          :value
          "program synthesis"
          :caret-position
          17
          :selection
          "")
      ^{"derived" [140027430962848 140027430963184], "info" {"description" "Program synthesis", "title"
"Wikipedia, the free encyclopedia", "url" "https://en.wikipedia.org/wiki/Main_Page"}, "id"
7018601161813142455}
      (dom/click
         :browser
         ^12400734517079715540 (ui/element-get
           :element
           ^10509243426986927186 (ui/element-find-all
             :element
             ^3303350788751170075 (ui/element-find-all
                :element
                desktop
                :properties
                [{"ControlType" "PaneControl"
                  "ClassName" "Chrome_WidgetWin_1"
                  "FrameworkId" "Win32"
                  "IsContentElement" true
                  "IsControlElement" true
                  "IsKeyboardFocusable" false
                  "IsPassword" false
                  "Name" "Wikipedia, the free encyclopedia - Google Chrome"}])
             :properties
             [{"ControlType" "DocumentControl", "ClassName" "Chrome_RenderWidgetHostHWND",
"IsContentElement" true, "IsControlElement" true, "IsKeyboardFocusable" true, "IsPassword" false}])
           :id
           0)
         :xpath
         "(//html[1]/body[1]/div[6]/div[1]/a[1]/div[1]/span[1])|//html/body/div/div/a/div/span[normalize-
space(text( ))='Program synthesis']")
      ^{"derived" [140027431008576 140027431008912], "info" {"description" "automatic programming",
"title" "Program synthesis - Wikipedia", "url" "https://en.wikipedia.org/wiki/Program_synthesis"}, "id"
18107719911637876025}
      (dom/click
         :browser
         ^5324061176701374150 (ui/element-get
           :element
           ^6629035501368696101 (ui/element-find-all
             :element
             ^9121091854659752786 (ui/element-find-all
                :element
                desktop
                :properties
                [{"ControlType" "PaneControl"
                  "ClassName" "Chrome_WidgetWin_1"
                  "FrameworkId" "Win32"
                  "IsContentElement" true
                  "IsControlElement" true
                  "IsKeyboardFocusable" false
                  "IsPassword" false
                  "Name" "Program synthesis - Wikipedia - Google Chrome"}])
             :properties
             [{"ControlType" "DocumentControl", "ClassName" "Chrome_RenderWidgetHostHWND",
"IsContentElement" true, "IsControlElement" true, "IsKeyboardFocusable" true, "IsPassword" false}])
           :id
           0)
         :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|(((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[5])/div[1]/p[1]/a[5])|//html/body/div/div/div/div/p/a
[normalize-space(text( ))='automatic programming']")
```

TABLE 6-continued

```
         ^{"derived" [140027431100368 140027431108960], "info" {"description" "Mildred Koss", "title"
"Automatic programming - Wikipedia", "url" "https://en.wikipedia.org/wiki/Automatic_programming"}, "id"
18324000959247669821}
            (dom/click
              :browser
              ^5133358049489954645 (ui/element-get
                :element
                ^17768947886705439255 (ui/element-find-all
                  :element
                  ^17885350154559573777 (ui/element-find-all
                    :element
                    desktop
                    :properties
                    [{"ControlType" "PaneControl"
                       "ClassName" "Chrome_WidgetWin_1"
                       "FrameworkId" "Win32"
                       "IsContentElement" true
                       "IsControlElement" true
                       "IsKeyboardFocusable" false
                       "IsPassword" false
                       "Name" "Automatic programming - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|((//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[4]/a[1])|//html/body/div/div/div/div/p/a
[normalize-space(text( ))='Mildred Koss']")
         ^{"derived" [140027430675696 140027430675984 140027430676224], "info" {"description" "Grace
Hopper", "title" "Milly Koss - Wikipedia", "url" "https://en.wikipedia.org/wiki/Milly_Koss"}, "id"
2613501213242432800}
            (dom/click
              :browser
              ^12421669760596489612 (ui/element-get
                element
                ^3263885897282848722 (ui/element-find-all
                  element
                  ^15534270806944969305 (ui/element-find-all
                    :element
                    desktop
                    :properties
                    [{"ControlType" "PaneControl"
                       "ClassName" "Chrome_WidgetWin_1"
                       "FrameworkId" "Win32"
                       "IsContentElement" true
                       "IsControlElement" true
                       "IsKeyboardFocusable" false
                       "IsPassword" false
                       "Name" "Milly Koss - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|((//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[3]/a[2])|//html/body/div/div/div/div/p/a
[normalize-space(text( ))='Grace Hopper']")
         ^{"derived" [140027430733664 140027430733952], "info" {"description" "Eckert-Mauchly Computer
Corpor", "title" "Grace Hopper - Wikipedia", "url" "https://en.wikipedia.org/wiki/Grace_Hopper"}, "id"
12056306564966649846}
            (dom/click
              :browser
              ^12166843278585302289 (ui/element-get
                :element
                ^6751217719276506268 (ui/element-find-all
                  :element
                  ^10092101544387532281 (ui/element-find-all
                    :element
                    desktop
                    :properties
                    [{"ControlType" "PaneControl"
                       "ClassName" "Chrome_WidgetWin_1"
                       "FrameworkId" "Win32"
```

TABLE 6-continued

```
                    "IsContentElement" true
                    "IsControlElement" true
                    "IsKeyboardFocusable" false
                    "IsPassword" false
                    "Name" "Grace Hopper - Wikipedia - Google Chrome"}])
                :properties
                [{"ControlType" "DocumentControl", "ClassName" "Chrome_RenderWidgetHostHWND",
"IsContentElement" true, "IsControlElement" true, "IsKeyboardFocusable" true, "IsPassword" false}])
              :id
              0)
            :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|((//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[3]/a[5])|//html/body/div/div/div/div/p/a
[normalize-space(text( ))='Eckert-Mauchly Computer Corporation']")
              ^{"derived" [140027430798432 140027430798720], "info" {"description" "Remington Rand", "title"
"Eckert-Mauchly Computer Corporation - Wikipedia", "url"
"https://en.wikipedia.org/wiki/Eckert%E2%80%93Mauchly_Computer_Corporation"}, "id"
14499456292347579399}
            (dom/click
              :browser
              ^7402524457469075130 (ui/element-get
                :element
                ^4083427145151337433 (ui/element-find-all
                  :element
                  ^8457773679519348176 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "Eckert-Mauchly Computer Corporation - Wikipedia - Google Chrome"}])
                  :properties
                  [{"ControlType" "DocumentControl", "ClassName" "Chrome_RenderWidgetHostHWND"
"IsContentElement" true, "IsControlElement" true, "IsKeyboardFocusable" true, "IsPassword" false}])
                :id
                0)
              :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|((//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[1]/a[5])|//html/body/div/div/div/div/p/a
[normalize-space(text( ))='Remington Rand']")
              ^{"derived" [140027430392640 140027430392928], "info" {"description" "Remington Typewriter
Company", "title" "Remington Rand - Wikipedia", "url" "https://en.wikipedia.org/wiki/Remington_Rand"},
"id" 16794925413169245047}
            (dom/click
              :browser
              ^9429726560000602189 (ui/element-get
                :element
                ^13769592484604538252 (ui/element-find-all
                  :element
                  ^4868201695316070277 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "Remington Rand - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
```

TABLE 6-continued

```
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|(//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[2]/a[1])|//html/body/div/div/div/div/p/a
[normalize-space(text( ))='Remington Typewriter Company']")
           ^{"derived" [140027430504336 140027430504624], "info" {"description" "Rand Kardex Bureau", "title"
"E. Remington and Sons - Wikipedia", "url"
"https://en.wikipedia.org/wiki/Remington_Typewriter_Company"}, "id" 10146574588384710775}
            (dom/click
              :browser
              ^5907351764944668302 (ui/element-get
                :element
                ^14098583219986365978 (ui/element-find-all
                  :element
                  ^9911045331821315806 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "E. Remington and Sons - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|(//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[12]/a[1])|//html/body/div/div/div/div/p/a
[normalize-space(text( ))='Rand Kardex Bureau']")
           ^{"derived" [140027430592624 140027430592912], "info" {"description" "Unisys", "title" "Kardex Group
- Wikipedia", "url" "https://en.wikipedia.org/wiki/Kardex_Group"}, "id" 312498431750502833}
            (dom/click
              :browser
              ^10203054350734562310 (ui/element-get
                :element
                ^18361517877125658474 (ui/element-find-all
                  :element
                  ^15677090644507258001 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "Kardex Group - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|(//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[1]/a[2])|//html/body/div/div/div/div/p/a
[normalize-space(text( ))='Unisys']")
           ^{"derived" [140027430645712 140027430134064], "info" {"description" "Burroughs", "title" "Unisys -
Wikipedia", "url" "https://en.wikipedia.org/wiki/Unisys"}, "id" 3404927827876718880}
            (dom/click
              :browser
              ^762733575618326401 (ui/element-get
                :element
                ^3733016897609940949 (ui/element-find-all
                  :element
                  ^12369886881862600046 (ui/element-find-all
                    :element
                    desktop
                    :properties
```

TABLE 6-continued

```
            [{"ControlType" "PaneControl"
               "ClassName" "Chrome_WidgetWin_1"
               "FrameworkId" "Win32"
               "IsContentElement" true
               "IsControlElement" true
               "IsKeyboardFocusable" false
               "IsPassword" false
               "Name" "Unisys - Wikipedia - Google Chrome"}])
            :properties
            [{"ControlType" "DocumentControl", "ClassName" "Chrome_RenderWidgetHostHWND",
"IsContentElement" true, "IsControlElement" true, "IsKeyboardFocusable" true, "IsPassword" false}])
            :id
            0)
         :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|((//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[2]/a[3])|//html/body/div/div/div/div/p/a
[normalize-space(text( ))='Burroughs']")
         ^{"derived" [140027430185184 140027430185472], "info" {"description" "American Arithmometer
Company", "title" "Burroughs Corporation - Wikipedia", "url"
"https://en.wikipedia.org/wiki/Burroughs_Corporation"}, "id" 12170720586240112391}
         (dom/click
            :browser
            ^6679322489274047416 (ui/element-get
               :element
               ^10120495495398435851 (ui/element-find-all
                  :element
                  ^2778280162754412393 (ui/element-find-all
                     :element
                     desktop
                     :properties
                     [{"ControlType" "PaneControl"
                        "ClassName" "Chrome_WidgetWin_1"
                        "FrameworkId" "Win32"
                        "IsContentElement" true
                        "IsControlElement" true
                        "IsKeyboardFocusable" false
                        "IsPassword" false
                        "Name" "Burroughs Corporation - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
               :id
               0)
            :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|((//html[1]/body[1]/div[@id='content']|//html[1]/body[1]/div[3])/div[@id='bodyContent']|(//html[1]/body
[1]/div[@id='content']|//html[1]/body[1]/div[3])/div[3])/div[5])/div[1]/p[1]/a[1])|//html/body/div/div/div/div/p/a
[normalize-space(text( ))='American Arithmometer Company']")
            ^{"derived" [140027430198960 140027430199248], "info" {"description" "St. Louis, Missouri", "title"
"American Arithmometer Company - Wikipedia", "url"
"https://en.wikipedia.org/wiki/American_Arithmometer_Company"}, "id" 10402972591515738305}
            (dom/click
               :browser
               ^13088772326325354242 (ui/element-get
                  :element
                  ^6803963507438760088 (ui/element-find-all
                     :element
                     ^13763482987182463249 (ui/element-find-all
                        :element
                        desktop
                        :properties
                        [{"ControlType" "PaneControl"
                           "ClassName" "Chrome_WidgetWin_1"
                           "FrameworkId" "Win32"
                           "IsContentElement" true
                           "IsControlElement" true
                           "IsKeyboardFocusable" false
                           "IsPassword" false
                           "Name" "American Arithmometer Company - Wikipedia - Google Chrome"}])
                     :properties
                     [{"ControlType" "DocumentControl", "ClassName" "Chrome_RenderWidgetHostHWND",
"IsContentElement" true, "IsControlElement" true, "IsKeyboardFocusable" true, "IsPassword" false}])
                  :id
                  0)
               :xpath
```

TABLE 6-continued

"(((((//html[1]/body[1]/div[@id='content']|//html[1]/body[1]/div[3])/div[@id='bodyContent']|(//html[1]/body[1]/div[@id='content']|//html[1]/body[1]/div[3])/div[3])/div[@id='mw-content-text']|(((//html[1]/body[1]/div[@id='content']|//html[1]/body[1]/div[3])/div[@id='bodyContent']|(//html[1]/body[1]/div[@id='content']|//html[1]/body[1]/div[3])/div[3])/div[5])/div[1]/p[1]/a[1])|//html/body/div/div/div/div/p/a[normalize-space(text( ))='St. Louis, Missouri']")
　　　　　　^{"derived" [140027430245376 140027430245664], "info" {"description" "22nd-largest in the United Sta", "title" "St. Louis - Wikipedia", "url" "https://en.wikipedia.org/wiki/St ._ Louis,_Missouri"}, "id" 9635071276665869216}
　　　　　(dom/click
　　　　　　:browser
　　　　　　^370777704706470106 (ui/element-get
　　　　　　　:element
　　　　　　　^14111395801584026731 (ui/element-find-all
　　　　　　　　:element
　　　　　　　　^9135965753917724548 (ui/element-find-all
　　　　　　　　　:element
　　　　　　　　　desktop
　　　　　　　　　:properties
　　　　　　　　　[{"ControlType" "PaneControl"
　　　　　　　　　　"ClassName" "Chrome_WidgetWin_1"
　　　　　　　　　　"FrameworkId" "Win32"
　　　　　　　　　　"IsContentElement" true
　　　　　　　　　　"IsControlElement" true
　　　　　　　　　　"IsKeyboardFocusable" false
　　　　　　　　　　"IsPassword" false
　　　　　　　　　　"Name" "St. Louis - Wikipedia - Google Chrome"}])
　　　　　　　　:properties
　　　　　　　　[{"ControlType" "DocumentControl", "ClassName" "Chrome_RenderWidgetHostHWND", "IsContentElement" true, "IsControlElement" true, "IsKeyboardFocusable" true, "IsPassword" false}])
　　　　　　:id
　　　　　　0)
　　　　　:xpath
"(((((//html[1]/body[1]/div[@id='content']|//html[1]/body[1]/div[3])/div[@id='bodyContent']|(//html[1]/body[1]/div[@id='content']|//html[1]/body[1]/div[3])/div[3])/div[@id='mw-content-text']|(((//html[1]/body[1]/div[@id='content']|//html[1]/body[1]/div[3])/div[@id='bodyContent']|(//html[1]/body[1]/div[@id='content']|//html[1]/body[1]/div[3])/div[3])/div[5])/div[1]/p[2]/a[9])|//html/body/div/div/div/div/p/a[normalize-space(text( ))='22nd-largest in the United States']")
　　　　　　^{"derived" [140027430300400 140027430300688], "info" {"description" "175 Combined Statistical Areas", "title" "Statistical area (United States) - Wikipedia", "url" "https://en.wikipedia.org/wiki/Primary_statistical_area#List_of_Primary_Statistical_Areas"}, "id" 13751770332342380234}
　　　　　(dom/click
　　　　　　:browser
　　　　　　^7730552093848303957 (ui/element-get
　　　　　　　:element
　　　　　　　^12896177885628094251 (ui/element-find-all
　　　　　　　　:element
　　　　　　　　^11320832518064821630 (ui/element-find-all
　　　　　　　　　:element
　　　　　　　　　desktop
　　　　　　　　　:properties
　　　　　　　　　[{"ControlType" "PaneControl"
　　　　　　　　　　"ClassName" "Chrome_WidgetWin_1"
　　　　　　　　　　"FrameworkId" "Win32"
　　　　　　　　　　"IsContentElement" true
　　　　　　　　　　"IsControlElement" true
　　　　　　　　　　"IsKeyboardFocusable" false
　　　　　　　　　　"IsPassword" false
　　　　　　　　　　"Name" "Statistical area (United States) - Wikipedia - Google Chrome"}])
　　　　　　　　:properties
　　　　　　　　[{"ControlType" "DocumentControl", "ClassName" "Chrome_RenderWidgetHostHWND", "IsContentElement" true, "IsControlElement" true, "IsKeyboardFocusable" true, "IsPassword" false}])
　　　　　　:id
　　　　　　0)
　　　　　:xpath
"(((((//html[1]/body[1]/div[@id='content']|//html[1]/body[1]/div[3])/div[@id='bodyContent']|(//html[1]/body[1]/div[@id='content']|//html[1]/body[1]/div[3])/div[3])/div[@id='mw-content-text']|(((//html[1]/body[1]/div[@id='content']|//html[1]/body[1]/div[3])/div[@id='bodyContent']|(//html[1]/body[1]/div[@id='content']|//html[1]/body[1]/div[3])/div[3])/div[5])/div[1]/table[1]/tbody[1]/tr[8]/td[1]/div[1]/ul[1]/li[2]/a[1])|//html/body/div/div/div/div/table/tbody/tr/td/div/ul/li/a[normalize-space(text( ))='175 Combined Statistical Areas']")

TABLE 6-continued

```
            ^{"derived" [140027430377552 140027430377840], "info" {"description" "New York-Newark, NY-NJ-
CT-PA C", "title" "Combined statistical area - Wikipedia", "url"
"https://en.wikipedia.org/wiki/Combined_statistical_area#List_of_combined_statistical_areas"}, "id"
14702013248687633277}
            (dom/click
              :browser
              ^13185885280061587581 (ui/element-get
                :element
                ^5889867979767134220 (ui/element-find-all
                  :element
                  ^9834920615697010848 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "Combined statistical area - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
"(((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|(((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[5])/div[1]/table[2]/tbody[1]/tr[1]/td[2]/a[1]")
            ^{"derived" [140027429953008 140027429953344], "info" {"description" "Bridgeport-Stamford-
Norwalk-Da", "title" "New York metropolitan area - Wikipedia", "url"
"https://en.wikipedia.org/wiki/New_York-Newark,_NY-NJ-CT-PA_Combined_Statistical_Area"}, "id"
3495650096362041239}
            (dom/click
              :browser
              ^923279323312540902 (ui/element-get
                :element
                ^15114941860030869495 (ui/element-find-all
                  :element
                  ^14718782220346152866 (ui/element-find-all
                    :element
                    desktop
                    :properties
                    [{"ControlType" "PaneControl"
                      "ClassName" "Chrome_WidgetWin_1"
                      "FrameworkId" "Win32"
                      "IsContentElement" true
                      "IsControlElement" true
                      "IsKeyboardFocusable" false
                      "IsPassword" false
                      "Name" "New York metropolitan area - Wikipedia - Google Chrome"}])
                  :properties
                  [{"ControlType" "DocumentControl", "ClassName" "Chrome_RenderWidgetHostHWND",
"IsContentElement" true, "IsControlElement" true, "IsKeyboardFocusable" true, "IsPassword" false}])
                :id
                0)
              :xpath
"(((//html[1]/body[1]/div[@id='content']|//html[1]/body[1]/div[3])/div[@id='bodyContent']|(//html[1]/body[1]/div
[@id='content']|//html[1]/body[1]/div[3])/div[3])/div[@id='mw-content-
text']|(((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[5])/div[1]/ul[3]/li[1]/a[1])|//html/body/div/div/div/div/ul/
li/a[normalize-space(text( ))='Bridgeport-Stamford-Norwalk-Danbury, CT']")
            ^{"derived" [140027430028816 140027430029104], "info" {"description" "Ansonia", "title" "Greater
Bridgeport - Wikipedia", "url" "https://en.wikipedia.org/wiki/Greater_Bridgeport"}, "id"
17419878050902122843}
            (dom/click
              :browser
              ^3931795168610018632 (ui/element-get
                :element
                ^4929591920772907921 (ui/element-find-all
                  :element
                  ^8793599438198862321 (ui/element-find-all
                    :element
                    desktop
                    :properties
```

TABLE 6-continued

```
    [{"ControlType" "PaneControl"
      "ClassName" "Chrome_WidgetWin_1"
      "FrameworkId" "Win32"
      "IsContentElement" true
      "IsControlElement" true
      "IsKeyboardFocusable" false
      "IsPassword" false
      "Name" "Greater Bridgeport - Wikipedia - Google Chrome"}])
   :properties
    [{"ControlType" "DocumentControl", "ClassName" "Chrome_RenderWidgetHostHWND",
"IsContentElement" true, "IsControlElement" true, "IsKeyboardFocusable" true, "IsPassword" false}])
   :id
    0)
  :xpath
"(((((//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[@id='mw-content-
text']|(//html[1]/body[1]/div[@id='content']|//html[1]/body[1]/div[3])/div[@id='bodyContent']|(//html[1]/body[1]/
div[@id='content']|//html[1]/body[1]/div[3])/div[3])/div[5])/div[1]/p[4]/a[3])|//html/body/div/div/div/div/p/a
[normalize-space(text( ))='Ansonia']")
   ^{"derived" [140027430106928 140027430107216], "info" {"description" "", "title" "Ansonia,
Connecticut - Wikipedia", "url" "https://en.wikipedia.org/wiki/Ansonia,_Connecticut"}, "id"
14304767858696959072}
  (dom/click
   :browser
    ^7730062156240089369 (ui/element-get
     :element
      ^2112096937617035223 (ui/element-find-all
       :element
        ^10960417636097339489 (ui/element-find-all
         :element
         desktop
         :properties
          [{"ControlType" "PaneControl"
            "ClassName" "Chrome_WidgetWin_1"
            "FrameworkId" "Win32"
            "IsContentElement" true
            "IsControlElement" true
            "IsKeyboardFocusable" false
            "IsPassword" false
            "Name" "Ansonia, Connecticut - Wikipedia - Google Chrome"}])
         :properties
          [{"ControlType" "DocumentControl", "ClassName" "Chrome_RenderWidgetHostHWND",
"IsContentElement" true, "IsControlElement" true, "IsKeyboardFocusable" true, "IsPassword" false}])
         :id
          0)
        :xpath
          "((//html[1]/body[1]/div[@id='mw-navigation']|//html[1]/body[1]/div[5])/div[@id='mw-
panel']|(//html[1]/body[1]/div[@id='mw-navigation']|//html[1]/body[1]/div[5])/div[2])/div[@id='p-
logo']|(//html[1]/body[1]/div[@id='mw-navigation']|//html[1]/body[1]/div[5])/div[@id='mw-
panel']|(//html[1]/body[1]/div[@id='mw-navigation']|//html[1]/body[1]/div[5])/div[2])/div[1])/a[1]")
      { })))))
```

What is claimed is:

1. A method for providing assisted automations, comprising:
   capturing a state of one or more objects via an electronic sensor in a world scene before and after at least one input that is given to at least one of the objects;
   compiling an assisted automation via a processing system based upon said capturing to convert a raw controller input and a world state into at least one compact semantic description of intent as a program in a formal programming language;
   executing the assisted automation to accomplish a step-by-step change in the world state towards an eventual task objective of a selected task;
   evaluating a consistency of the step-by-step change via the electronic sensor with an expectation comprising a generalization of the world states encountered during recordings;
   converting at least one program step of the program into an executable runtime action via the processing system;
   synthesizing an iteratively improving automation via the processing system based upon the executed assisted automation by recording the world state and the at least one input that is given to at least one of the objects during runtime execution; and
   combining a result of said compiling the assisted automation with at least one result of a previous compiling of the assisted automation to provide a single program that includes one or more synthesized expressions for automatically computable values and for computable decisions.

2. The method of claim 1, further comprising mining the at least one assisted automation without annotations labelling a task start and a task end of the selected task by:
   capturing the state of the one or more objects via the electronic sensor in a world scene as a continuous unannotated stream;
   computing a start and an end of tasks within the continuous unannotated stream; and
   compiling and synthesizing via the processing system a generalized assisted automation from one or more identified fragments within the continuous unannotated steam.

3. The method of claim 1, further comprising using a digital processor to automatically predict a task under progress as a start of the assisted automation for auto-completing the task under progress.

4. The method of claim 3, further comprising:
simulating execution of a plurality of the assisted automations with the world state and the controller input from a present time to a selected past time without modifying the world state such that a predetermined number of automations can be simulated for checking viability against an observed world state; and
identifying a selected simulated assisted automation, from amongst an input repository of generalized assisted automations, that is most likely to represent the selected task to automatically finish the selected task or to get instructions assisting completion of the selected task.

5. The method of claim 1, further comprising composing assisted automations by feeding an output of a first assisted automation as an input of a second assisted automation either in parallel or sequentially.

6. The method of claim 5, further comprising deciding whether to proceed based on the output from the first assisted automation that is sent to the second assisted automation.

7. The method of claim 5, wherein the composed assisted automations are executed automatically, by a selected operator or by two or more different operators with hand-offs and can be triggered from external world events.

8. The method of claim 7, wherein the external world events include timing events, the world state meeting a stated condition or both.

9. The method of claim 1, wherein said capturing the state of the one or more objects includes instrumenting a controller to send at least one controller input to the world scene, executing a first state captured before the controller sends the at least one controller input, capturing the at least one controller input, and executing a second state captured after the controller sends the at least one controller input.

10. The method of claim 1, wherein the formal programming language is human-readable, can be generated by a machine or both, or wherein a program in the formal programming language is symbolically executable.

11. The method of claim 1, wherein said compiling the assisted automation includes compiling the assisted automation based upon said capturing to convert a plurality of raw controller inputs, a plurality of world states or both into the at least one compact semantic description of intent.

12. The method of claim 1, wherein said executing the assisted automation includes determining an execution runtime and analyzing the world state at each step in the step-by-step change in the world state.

13. The method of claim 1, wherein said converting the at least one program step of the program includes converting the at least one program step into one or more controller inputs for being provided to at least one specified object specified by a resulting execution of the task being performed without human intervention via the assisted automation.

14. The method of claim 1, wherein said converting the at least one program step of the program includes converting the at least one program step of the program into one or more human understandable instructions for guiding a human to perform the runtime action by sending at least one human input to a preselected object in the world scene to modify a state of the preselected object.

15. The method of claim 1, wherein said executing the assisted automation includes executing the assisted automation in a fully-automated manner.

16. The method of claim 1, wherein said executing the assisted automation includes executing the assisted automation in a human-assisted manner.

17. A method for building desktop graphical user interface assisted automations, comprising:
capturing a state of one or more objects on a desktop before and after at least one input that is given to at least one of the objects on the desktop;
compiling an assisted automation based upon said capturing to convert a raw keyboard and mouse input and state of one or more objects on the desktop into at least one compact semantic description of intent as a program in a formal programming language;
executing the assisted automation to accomplish a step-by-step change in the state of one or more objects on the desktop towards an eventual task objective of a desktop task;
evaluating a consistency of the step-by-step change with an expectation comprising a generalization of the state of one or more objects on the desktop encountered during recordings;
converting at least one program step of the program into an executable runtime action;
synthesizing an iteratively improving automation based upon the executed assisted automation by recording the state of one or more objects on the desktop and the at least one input that is given to at least one of the objects during runtime execution; and
combining a result of said compiling the assisted automation with at least one result of a previous compiling of the assisted automation to provide a single program that includes one or more synthesized expressions for automatically computable values and for computable decisions.

18. The method of claim 17, further comprising presenting on-screen prompts or on-screen instructions for guiding and training users on desktop applications.

19. The method of claim 17, further comprising performing assisted automated execution on the desktop for fully or partially automatically executing the tasks over desktop applications.

20. The method of claim 17, further comprising providing a repository of assisted automations, comprising at least one of:
dashboard listing workflows available;
an execution history of workflows;
an access control for workflows; and
workflow summaries and metadata.

21. The method of claim 17, further comprising enabling execution of the assisted automation in a cloud environment or a conventional desktop, said enabling the execution of the assisted automation including generating universal resource identifiers to identify workflows and sharing universal resource identifiers to identify workflows.

22. The method of claim 17, wherein said executing the assisted automation includes converting machine instructions for desktop manipulation into abstracted operations understandable to a human.

23. The method of claim 17, wherein said executing the assisted automation comprises fully automatically executing the assisted automation and includes evaluating the state of the one or more objects on the desktop, evaluating an instruction in the assisted automation, and invoking the executable runtime action as specified by the assisted automation on at least one of the objects on the desktop.

24. The method of claim 17, further comprising converting the raw keyboard and mouse input and the state of the one or more objects on the desktop into a desktop task intent via a compiler, comprising:
- capturing the raw mouse and keyboard input with snapshots of the state of one or more objects on the desktop;
- capturing application specific semantic states for applications that expose application specific semantic states;
- using compiler analysis passes to analyze a stream of the captured mouse and keyboard input with the captured snapshots of the state of one or more objects on the desktop; and
- using compiler transformation passes to convert the stream of raw keyboard and mouse input and the state of the one or more objects on the desktop into semantic runtime executable actions on the desktop.

\* \* \* \* \*